US011325540B2

(12) United States Patent
Gaddis

(10) Patent No.: US 11,325,540 B2
(45) Date of Patent: May 10, 2022

(54) BIKE CARRIER

(71) Applicant: J.R. Setina Manufacturing Co., Olympia, WA (US)

(72) Inventor: Jon L. Gaddis, Walla Walla, WA (US)

(73) Assignee: J.R. Setina Manufacturing Co., Olympia, WA (US)

( * ) Notice: Subject to any disclaimer, the term of this patent is extended or adjusted under 35 U.S.C. 154(b) by 50 days.

(21) Appl. No.: 16/899,509

(22) Filed: Jun. 11, 2020

(65) Prior Publication Data

US 2021/0101538 A1  Apr. 8, 2021

Related U.S. Application Data

(63) Continuation-in-part of application No. 29/709,386, filed on Oct. 14, 2019.

(60) Provisional application No. 62/912,332, filed on Oct. 8, 2019.

(51) Int. Cl.
*B60R 9/10* (2006.01)
(52) U.S. Cl.
CPC ..................... *B60R 9/10* (2013.01)
(58) Field of Classification Search
CPC .. B60R 9/10; B60R 9/06; B60R 19/48; B60R 2011/004; B60R 2011/0082; Y10S 224/924
See application file for complete search history.

(56) References Cited

U.S. PATENT DOCUMENTS

| 2,432,732 A | 12/1947 | Del Cano | |
|---|---|---|---|
| 3,367,548 A | 2/1968 | Cooper | |
| 3,670,935 A | 6/1972 | Hinkston | |
| 4,298,151 A * | 11/1981 | O'Connor | B60R 9/10 224/329 |
| 4,299,341 A | 11/1981 | Copeland et al. | |
| 5,121,862 A * | 6/1992 | Schmidt | B60R 9/06 211/17 |
| 5,228,607 A * | 7/1993 | Tolsdorf | B60R 9/06 224/520 |
| 5,232,133 A * | 8/1993 | Speer | B60R 9/06 224/485 |
| 5,388,736 A * | 2/1995 | Schmidt | B60R 9/06 224/520 |

(Continued)

OTHER PUBLICATIONS

Facebook Search Results in West Coast Lights and Sirens, downloaded from https://www.facebook.com/page/177312988973777/search/?q=bike, 8 pp. (dated. Dec. 5, 2013) (downloaded on Oct. 7, 2020).

(Continued)

*Primary Examiner* — Brian D Nash
(74) *Attorney, Agent, or Firm* — Klarquist Sparkman, LLP

(57) ABSTRACT

A bike carrier includes a carrier frame having movable frame members with bends configured to directly or indirectly engage a structure on a vehicle. The frame members include arm segments configured to support one or more bicycles. The frame members include leg segments directly or indirectly connected to support movement of the arm segments toward and away from each other. The bike carrier also includes a quick-release mechanism positioned in proximity to the leg segments and configured for securing the bike carrier directly or indirectly to the vehicle.

23 Claims, 23 Drawing Sheets

(56) References Cited

U.S. PATENT DOCUMENTS

| | | | | |
|---|---|---|---|---|
| 5,579,972 | A * | 12/1996 | Despain | B60R 9/10 224/506 |
| 5,833,074 | A | 11/1998 | Phillips | |
| 5,938,093 | A | 8/1999 | Bloemer et al. | |
| 5,950,892 | A * | 9/1999 | Tsai | B60R 9/10 224/520 |
| 6,045,022 | A | 4/2000 | Giles | |
| 6,047,869 | A | 4/2000 | Chiu | |
| 6,968,986 | B1 * | 11/2005 | Lloyd | B60R 9/06 224/504 |
| 6,971,565 | B2 * | 12/2005 | Wang | B60R 9/06 224/497 |
| 7,290,670 | B2 * | 11/2007 | Huang | B60R 9/10 211/17 |
| 7,784,656 | B2 * | 8/2010 | Morrill | B60R 9/10 224/504 |
| 7,806,308 | B2 * | 10/2010 | Gunn | B60R 9/06 224/514 |
| 9,254,790 | B2 * | 2/2016 | Dreger | B60R 11/06 |
| 10,384,618 | B2 * | 8/2019 | Williams | B60R 9/06 |
| 10,577,040 | B1 * | 3/2020 | Goates | B62H 3/06 |
| 10,780,854 | B1 | 9/2020 | Hixson | |
| 2004/0256430 | A1 | 12/2004 | Wang | B60R 9/06 224/520 |
| 2005/0061842 | A1 * | 3/2005 | Tsai | B60R 9/06 224/501 |
| 2005/0082329 | A1 * | 4/2005 | Cohen | B60R 9/10 224/519 |
| 2009/0120984 | A1 * | 5/2009 | Sautter | B60R 9/10 224/497 |
| 2009/0236382 | A1 * | 9/2009 | Sautter | B60R 9/10 224/497 |
| 2012/0000952 | A1 * | 1/2012 | Dreger | B60R 11/06 224/533 |
| 2012/0234883 | A1 * | 9/2012 | Sautter | B60R 9/06 224/502 |
| 2016/0001710 | A1 * | 1/2016 | Prescott | B60R 9/06 224/536 |
| 2016/0185304 | A1 * | 6/2016 | Pedrini | B60R 9/06 224/572 |
| 2016/0355140 | A1 * | 12/2016 | Condon | B60R 9/10 |
| 2019/0016270 | A1 * | 1/2019 | Nordstrom | B60R 9/10 |
| 2019/0270423 | A1 | 9/2019 | Hutton | |
| 2020/0156724 | A1 * | 5/2020 | Kuschmeader | B62H 3/12 |
| 2020/0198546 | A1 * | 6/2020 | Casagrande | B60R 9/045 |
| 2020/0369216 | A1 * | 11/2020 | Alm | B60R 9/06 |

OTHER PUBLICATIONS

Swagman G10 2 bike platform hitch mount bike rack, downloaded from https://www.swagman.net/product.htm?pid=828199&cat=40492 on May 18, 2020.

"Technical Specifications," Adaptable Technologies LLC, 2019c, downloaded from https://www.adaptabletechnologiesllc.com/technology on May 18, 2020.

"Vehicle-Mounted Bike Racks for Public Safety Cyclists," IPMBA News (Jan. 10, 2008), downloaded from http://ipmba.org/resources/product-detail/vehicle-mounted-bike-racks-for-public-safety-cyclists on May 18, 2020.

* cited by examiner

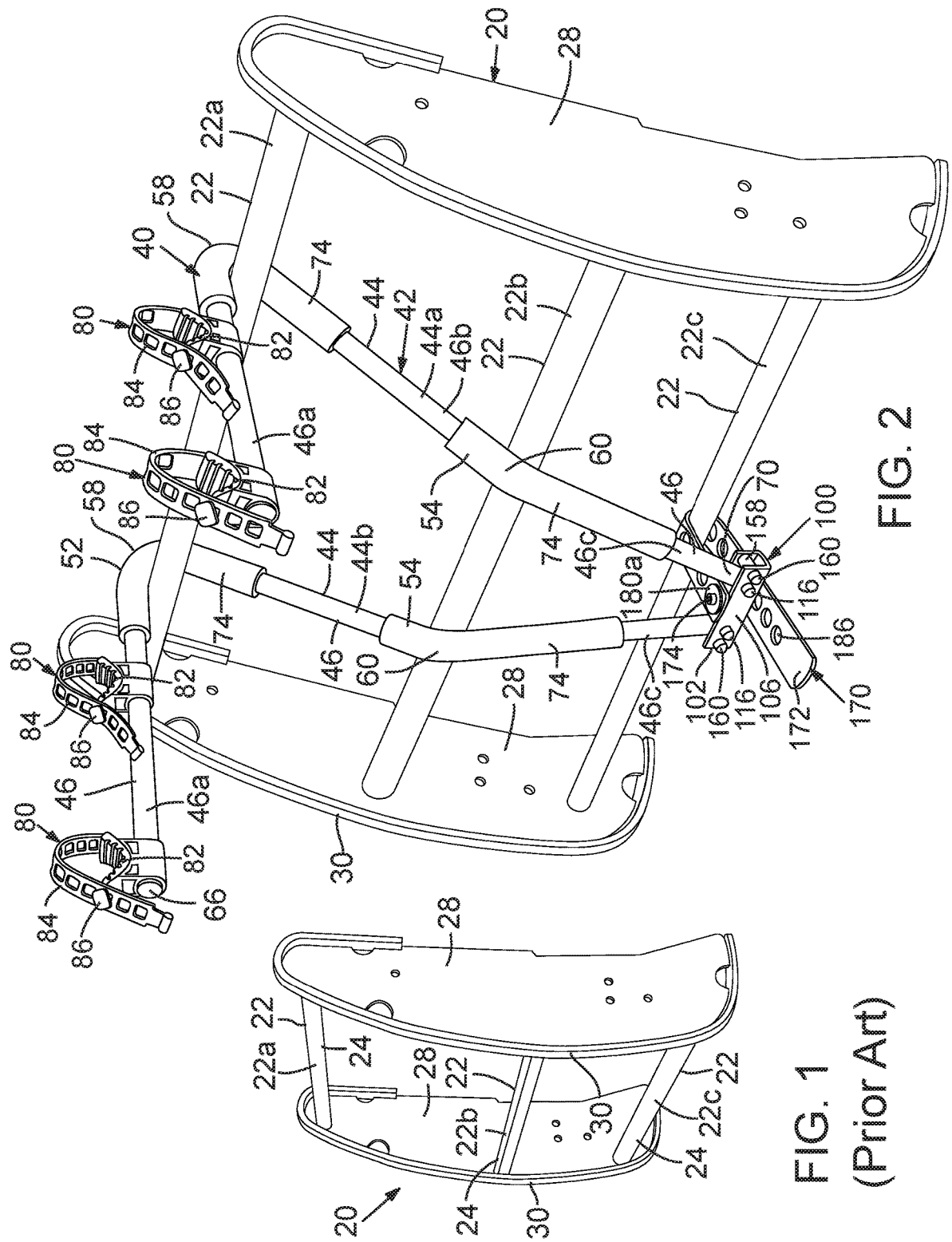

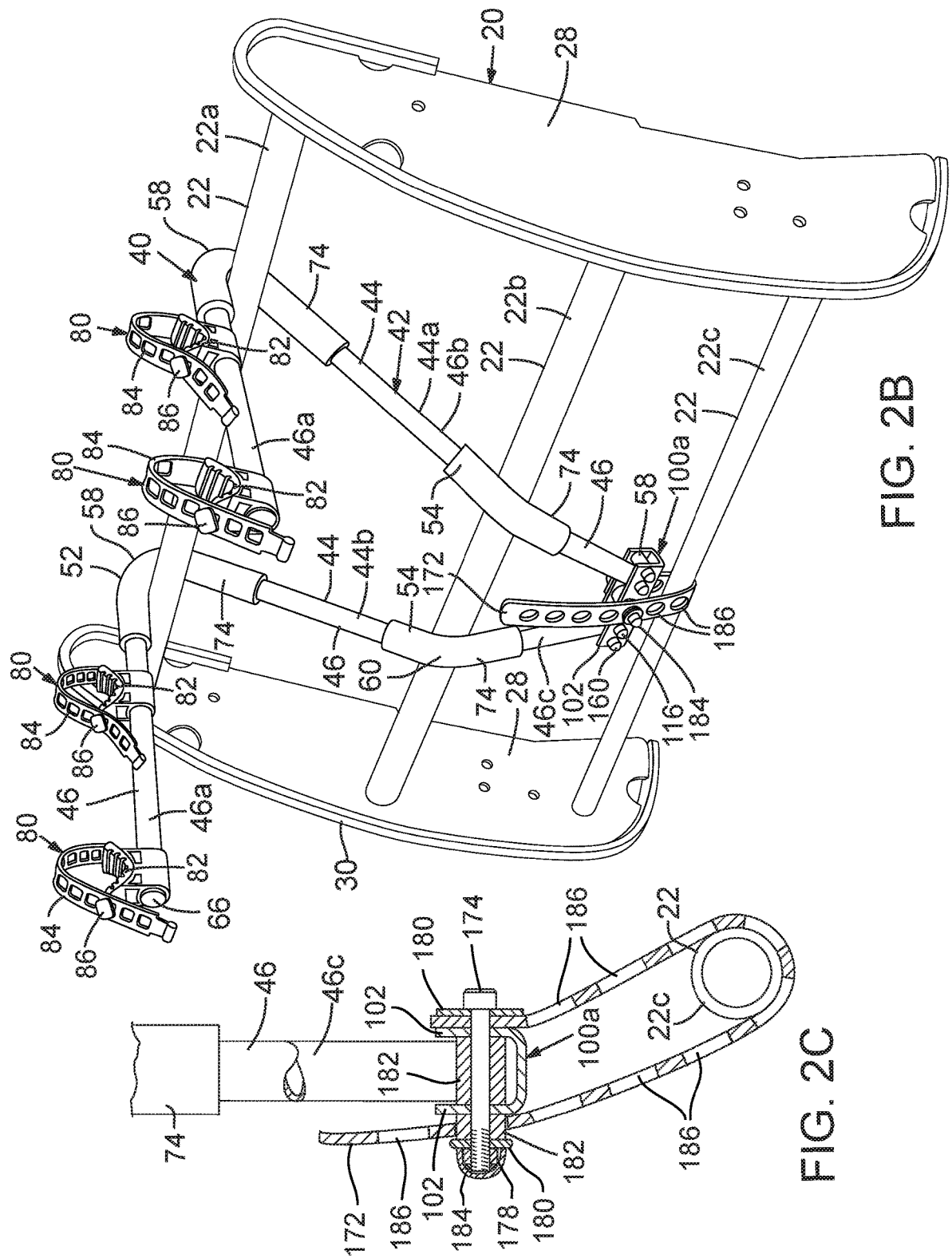

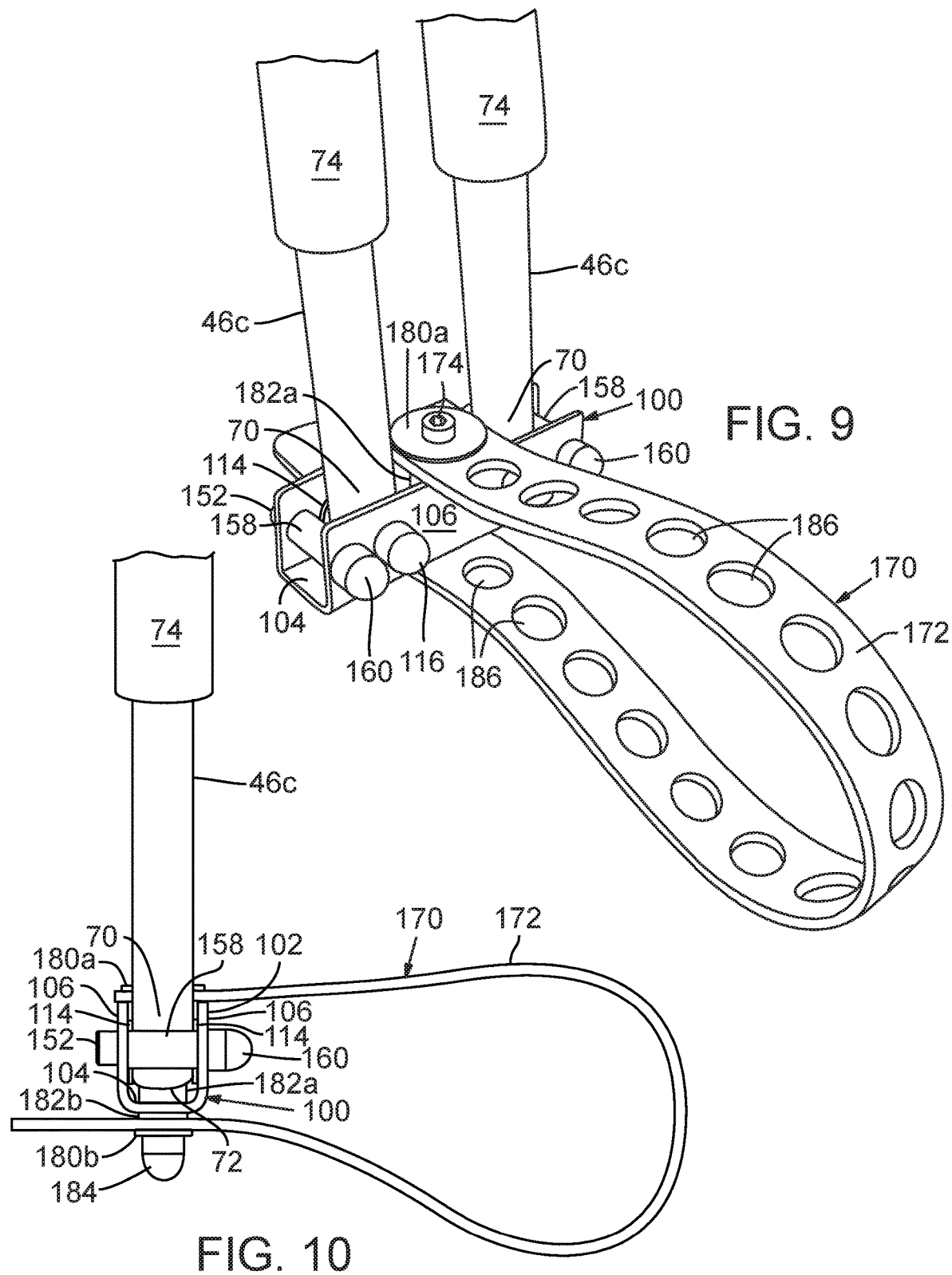

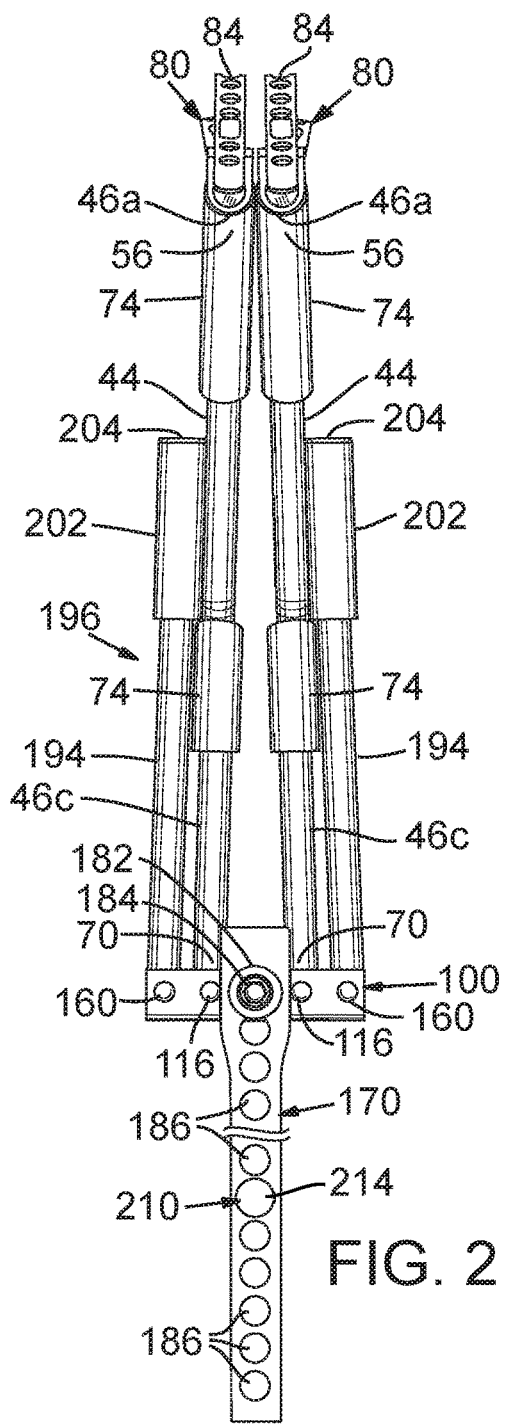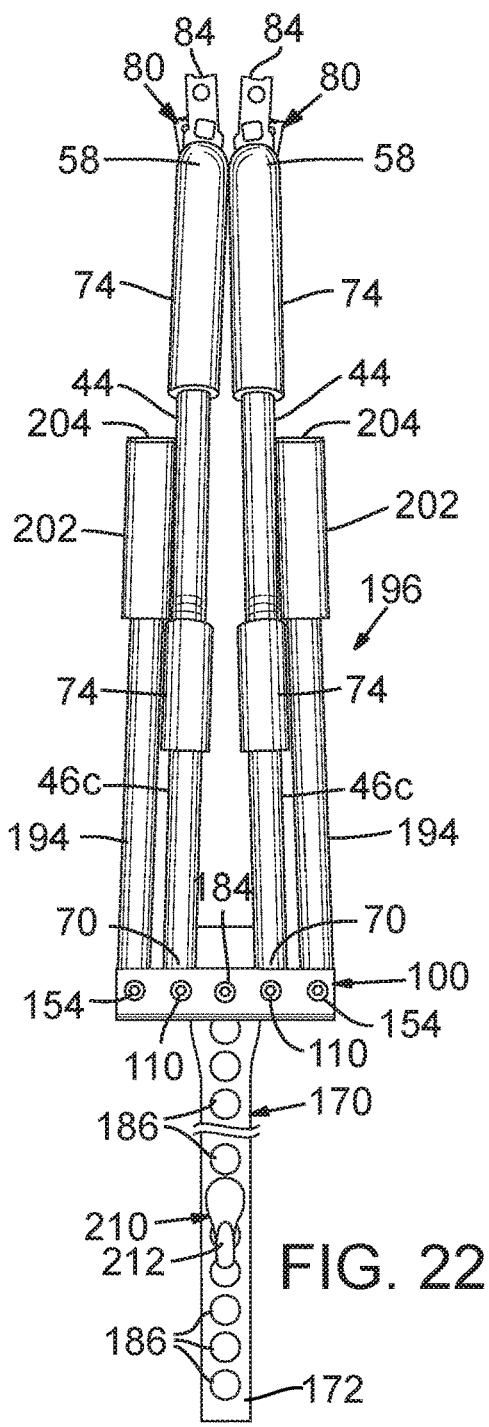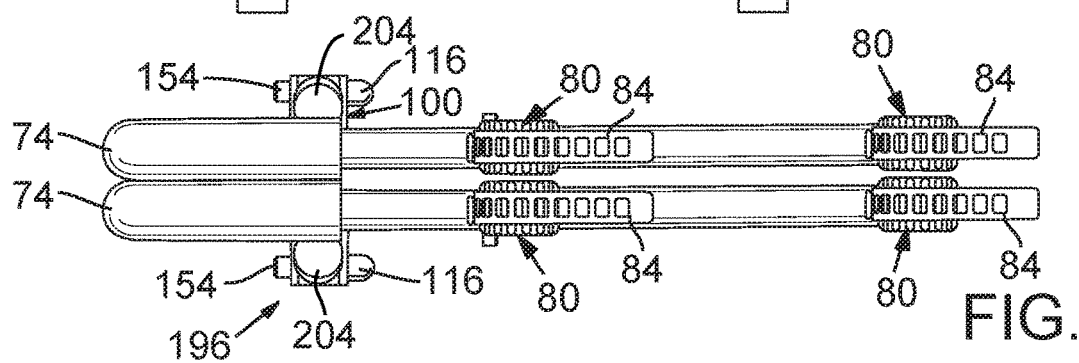

BIKE CARRIER

CROSS REFERENCE TO RELATED APPLICATION

This application claims priority under 35 U.S.C. § 119(e) to U.S. Provisional Patent Application No. 62/912,332, entitled "Bike Carrier," filed Oct. 8, 2019. The entire disclosure of this provisional patent application is incorporated by reference herein. This application is also a continuation-in-part of U.S. Design patent application No. 29/709,386, entitled "Bike Carrier," filed Oct. 14, 2019 and claims priority therefrom under 35 U.S.C. § 120. The entire disclosure of this design patent application is incorporated by reference herein.

TECHNICAL FIELD

The field of this disclosure relates generally to bike carriers and, in particular, to quick-mount or quick-release bike carriers, such as bike carriers suitable for mounting on a vehicle structure, such as a push bumper of a law enforcement vehicle.

BACKGROUND INFORMATION

Exterior carriers have been used to support luggage, tools, equipment, sport equipment, sport vehicles and all manner of other things on the exterior of a vehicle for decades. These exterior carriers can generally be permanent or removable. The permanent carriers are typically either manufactured with the vehicle or are attached to the vehicle in a manner that permanently modifies the vehicle, such by drill holes or welds used to fasten connectors to the structure of the exterior carrier.

Removable exterior carriers, such as roof carriers, can be removably connected to a vehicle, such as to door or window seams, or to a vehicle structure, such as a roof rack, a bumper, or a trailer hitch. Some of these exterior carriers can be somewhat generic and suitable for mounting to a great variety of makes and models of vehicles, while some of these exterior carriers may be adapted only to very specific makes and models of vehicles.

Exterior carriers are for convenience further described by way of example to bike carriers. Bike carriers are typically mounted to a roof (or roof rack) or a rear of a vehicle, such as to a bumper, window, hatch, or trailer hitch. These bike carriers typically support one or more bikes in only one of many dedicated orientations and typically by the bicycle wheels or by the bicycle frame. These orientations include: upright and aligned with the direction of travel of the vehicle; upright and aligned perpendicular to the direction of travel of the vehicle; and vertical with one wheel aligned above the other wheel.

Removable bike carriers, also referred to as quick-release bike carriers are configured to be readily attached to a vehicle (or a vehicle structure like a roof rack or bumper or hitch) when the removable bike carrier is needed and readily disengaged from the vehicle (or its structure) when the removable bike carrier is not needed so that it can be stored in a vehicle trunk or cargo area or in a garage away from the vehicle. Many removable bike carriers require tools to mount them directly or indirectly to the vehicles or require adjustments or pre-adjustments so that they are properly tailored to a particular make a model of a vehicle.

Most removable bike carriers are not collapsible, i.e., their volumetric perimeter is not reducible. However, some removable bike carriers have horizontal bike frame support portions that fold downward toward a central support column. This collapsibility permits the profile of the removable bike carrier to be shortened, such as at the rear of a vehicle when the bike carrier is not supporting bicycles.

Despite the wide variety of off-the-shelf bike carriers that are available, there are many circumstances for bike carriers that have not been met.

Overview of Disclosure

One aspect of this disclosure relates to bike carriers that can be quickly engaged and quickly disengaged from a vehicle structure, such as a vehicle bumper.

Another aspect of this disclosure relates to bike carriers that are collapsible, such as bike carriers in which the bicycle-frame support arms are collapsible toward each other.

In some embodiments, a bike carrier configured for placement about a vehicle structure. The bike carrier comprises: a carrier frame including a first frame member and a second frame member, wherein the first frame member includes multiple first segments including a first arm segment directly or indirectly connected to a first leg segment, wherein the multiple first segments are connected at first nonzero angles, wherein the second frame member includes multiple second segments including a second arm segment directly or indirectly connected to a second leg segment, wherein the multiple second segments are connected at second nonzero angles; a frame connector configured to connect directly or indirectly to the first frame member and the second frame member in a manner that permits relative movement between the first arm segment and the second arm segment; and a quick-release mechanism configured for securing the bike carrier directly or indirectly to the vehicle structure.

In some additional, alternative, or selectively cumulative embodiments, a kit for assembly of a bike carrier comprises: a first frame member including multiple first segments including a first arm segment directly or indirectly connected to a first leg segment, wherein the multiple first segments are connected at first nonzero angles; a second frame member including multiple second segments including a second arm segment directly or indirectly connected to a second leg segment, wherein the multiple second segments are connected at second nonzero angles; a variable frame connection mechanism that is configured to directly or indirectly connect the first frame member to the second frame member in a manner that permits relative movement between the first arm segment and the second arm segment; and a quick-release mechanism configured for securing the frame connection mechanism, the first frame member, or the second frame member directly or indirectly to a vehicle structure.

In some additional, alternative, or selectively cumulative embodiments, a bike carrier includes a carrier frame including a first frame member and a second frame member, wherein the first frame member includes multiple first segments including a first arm segment directly or indirectly connected to a first leg segment, wherein the multiple first segments are connected at first nonzero angles, wherein the second frame member includes multiple second segments including a second arm segment directly or indirectly connected to a second leg segment, wherein the multiple second segments are connected at second nonzero angles, wherein the bike carrier includes a frame connector configured to connect directly or indirectly to the first frame member and the second frame member in a manner that permits relative movement between the first arm segment and the second arm segment, wherein the bike carrier includes a quick-release mechanism configured for securing the frame connection mechanism, the first frame member, or the second frame member directly or indirectly to a vehicle structure, wherein the vehicle structure has first and second spaced-apart, generally horizontal structural members connected directly or indirectly to a vehicle, and wherein a lower vehicle structure is connected directly or indirectly to the vehicle. A method for attaching a bike carrier to a vehicle structure comprises: placing the bike carrier so that a first arm bend extending from the first arm segment is supported by the first horizontal structural member, so that a second arm bend extending from the second arm segment is supported by the first horizontal structural member, so that a portion of another one of the first multiple segments rests against the second horizontal structural member, and so that a portion of another one of the second multiple segments rests against the second horizontal structural member; adjusting distance between the first arm segment and the second arm segment; and reversibly connecting the quick-release mechanism so that it engages the lower vehicle structure.

In some additional, alternative, or selectively cumulative embodiments, a bike carrier is configured for placement about a vehicle structure. The bike carrier comprises: a carrier frame including a first frame member and a second frame member, wherein the first frame member includes a first arm segment directly or indirectly connected to a first leg segment, wherein the first frame member optionally includes a first central segment connected directly or indirectly between the first arm segment and the first leg segment, wherein the first arm segment and the first central segment or the first leg segment are generally oriented at a first arm angle, wherein the second frame member includes a second arm segment directly or indirectly connected to a second leg segment, wherein the second frame member optionally includes a second central segment connected directly or indirectly between the second arm segment and the second leg segment, and wherein the second arm segment and the second central segment or the second leg segment are generally oriented at a second arm angle; a frame connector configured to connect directly or indirectly to the first frame member and the second frame member in a manner that permits relative movement between the first arm segment and the second arm segment; and a quick-release mechanism configured for securing the bike carrier directly or indirectly to the vehicle structure.

In some additional, alternative, or selectively cumulative embodiments, a kit for assembly of a bike carrier comprises: a first frame member including a first arm segment directly or indirectly connected to a first leg segment, wherein the first frame member optionally includes a first central segment connected directly or indirectly between the first arm segment and the first leg segment, and wherein the first arm segment and the first central segment or the first leg segment are generally oriented at a first arm angle; a second frame member including a second arm segment directly or indirectly connected to a second leg segment, wherein the second frame member optionally includes a second central segment connected directly or indirectly between the second arm segment and the second leg segment, and wherein the second arm segment and the second central segment or the second leg segment are generally oriented at a second arm angle; a variable frame connection mechanism that is configured to directly or indirectly connect the first frame member to the second frame member in a manner that permits relative movement between the first arm segment and the second arm segment; and a quick-release mechanism configured for securing the frame connection mechanism, the first frame member, or the second frame member directly or indirectly to a vehicle structure.

In some additional, alternative, or selectively cumulative embodiments, a bike carrier includes a carrier frame including a first frame member and a second frame member, wherein the first frame member includes a first arm segment directly or indirectly connected to a first leg segment, wherein the first frame member optionally includes a first central segment connected directly or indirectly between the first arm segment and the first leg segment, wherein the first arm segment and the first central segment or the first leg segment are generally oriented at a first arm angle, wherein the second frame member includes a second arm segment directly or indirectly connected to a second leg segment, wherein the second frame member optionally includes a second central segment connected directly or indirectly between the second arm segment and the second leg segment, wherein the second arm segment and the second central segment or the second leg segment are generally oriented at a second arm angle, wherein the bike carrier includes a frame connector configured to connect directly or indirectly to the first frame member and the second frame member in a manner that permits relative movement between the first arm segment and the second arm segment, wherein the bike carrier includes a quick-release mechanism configured for securing the frame connection mechanism, the first frame member, or the second frame member directly or indirectly to a vehicle structure, wherein the vehicle structure has first and second spaced-apart, generally horizontal structural members connected directly or indirectly to a vehicle, and wherein a lower vehicle structure is connected directly or indirectly to the vehicle. A method for attaching a bike carrier to a vehicle structure comprises: placing the bike carrier so that a first arm bend between the first arm segment and the first central segment or the first leg segment is supported by the first horizontal structural member, so that a second arm bend between the second arm segment and the second central segment or the second leg segment is supported by the first horizontal structural member, so that a portion of the first leg segment rests against the second horizontal structural member, and so that a portion of the second leg segment rests against the second horizontal structural member; adjusting distance between the first arm segment and the second arm segment; and reversibly connecting the quick-release mechanism so that it engages the lower vehicle structure.

In some additional, alternative, or selectively cumulative embodiments, a bike carrier is configured for placement about a vehicle structure having first and second spaced-apart, generally horizontal structural members connected to a vehicle. The bike carrier comprises a carrier frame including a first frame member and a second frame member, wherein the first frame member includes a first central segment connected at a first arm angle to a first arm segment and connected at a first leg angle to a first leg segment, and wherein the second frame member includes a second central segment connected at a second arm angle to a second arm segment and connected at a second leg angle to a second leg segment. The bike carrier also comprises a frame connector positioned to connect directly or indirectly to the first frame member and the second frame member, and a quick-release mechanism configured for securing the bike carrier to one of the first and second generally horizontal structural members.

In some additional, alternative, or selectively cumulative embodiments, a bike carrier is configured for placement about a vehicle structure having first and second spaced-apart, generally horizontal structural members connected to a vehicle. The bike carrier comprises a carrier frame including a first frame member and a second frame member, wherein the first frame member includes a first central segment connected at a first arm angle to a first arm segment and connected at a first leg angle to a first leg segment, and wherein the second frame member includes a second central segment connected at a second arm angle to a second arm segment and connected at a second leg angle to a second leg segment. The bike carrier also comprises a frame connector positioned to connect directly or indirectly to the first frame member and the second frame member, and a quick-release means configured for securing the bike carrier to one of the first and second generally horizontal structural members.

In some additional, alternative, or selectively cumulative embodiments, a bike carrier configured for direct or indirect connection to a vehicle comprises: a carrier frame including a first frame member and a second frame member, wherein the first frame member includes a first central segment connected at a first nonzero arm angle to a first arm segment and connected at a first leg angle to a first leg segment, wherein the second frame member includes a second central segment connected at a second nonzero arm angle to a second arm segment and connected at a second leg angle to a second leg segment, wherein the first leg segment has a first distal end and a first distal leg portion adjacent the first distal end, and wherein the second leg segment has a second distal end and a second distal leg portion adjacent the second distal end; a frame connector positioned to connect directly or indirectly to the first frame member and the second frame member, wherein the first distal leg portion is directly or indirectly connected to the frame connector in a manner to permit relative movement between the frame connector and the first distal leg portion, and wherein the second distal leg portion is directly or indirectly connected to the frame connector in a manner to permit relative movement between the frame connector and the second distal leg portion; and a quick-release mechanism configured for securing the bike carrier directly or indirectly to the vehicle.

In some additional, alternative, or selectively cumulative embodiments, a bike carrier configured for direct or indirect connection to a vehicle comprises: a carrier frame including a first frame member and a second frame member, wherein the first frame member includes a first central segment connected at a first nonzero arm angle to a first arm segment and connected at a first leg angle to a first leg segment, wherein the second frame member includes a second central segment connected at a second nonzero arm angle to a second arm segment and connected at a second leg angle to a second leg segment, wherein the first leg segment has a first distal end and a first distal leg portion adjacent the first distal end, and wherein the second leg segment has a second distal end and a second distal leg portion adjacent the second distal end; a variable frame connection mechanism that directly or indirectly connects the first frame member to the second frame member, wherein the variable frame connection mechanism permits a variable distance between the first arm segment and the second arm segment; and a quick-release mechanism configured for securing the bike carrier directly or indirectly to the vehicle.

In some additional, alternative, or selectively cumulative embodiments, a bike carrier configured for direct or indirect connection to a vehicle comprises: a carrier frame including a first frame member and a second frame member, wherein the first frame member includes a first central segment connected at a first nonzero arm angle to a first arm segment and connected at a first leg angle to a first leg segment, wherein the second frame member includes a second central segment connected at a second nonzero arm angle to a second arm segment and connected at a second leg angle to a second leg segment, wherein the first leg segment has a first distal end and a first distal leg portion adjacent the first distal end, and wherein the second leg segment has a second distal end and a second distal leg portion adjacent the second distal end; a variable frame connection means for directly or indirectly connecting the first frame member to the second frame member and for permitting a variable distance between the first arm segment and the second arm segment; and a quick-release mechanism configured for securing the bike carrier directly or indirectly to the vehicle.

In some additional, alternative, or selectively cumulative embodiments, a bike carrier is configured for placement about a vehicle structure having first and second spaced-apart, generally horizontal structural members connected to a vehicle. The bike carrier comprises a carrier frame including a first frame member and a second frame member, wherein the first frame member includes a first central segment connected at a first arm angle to a first arm segment and connected at a first leg angle to a first leg segment, and wherein the second frame member includes a second central segment connected at a second arm angle to a second arm segment and connected at a second leg angle to a second leg segment; a frame connector positioned to connect directly or indirectly to the first frame member and the second frame member; and a toolless-release mechanism configured for securing the bike carrier to one of the first and second generally horizontal structural members.

In some additional, alternative, or selectively cumulative embodiments, a bike carrier is configured for placement about a vehicle structure having first and second spaced-apart, generally horizontal structural members connected to a vehicle. The bike carrier comprises a carrier frame including a first frame member and a second frame member, wherein the first frame member includes a first central segment connected at a first arm angle to a first arm segment and connected at a first leg angle to a first leg segment, and wherein the second frame member includes a second central segment connected at a second arm angle to a second arm segment and connected at a second leg angle to a second leg segment; a frame connector positioned to connect directly or indirectly to the first frame member and the second frame member; and a toolless-release means configured for securing the bike carrier to one of the first and second generally horizontal structural members.

In some additional, alternative, or selectively cumulative embodiments, a bike carrier configured for direct or indirect connection to a vehicle comprises: a carrier frame including a first frame member and a second frame member, wherein the first frame member includes a first central segment connected at a first nonzero arm angle to a first arm segment and connected at a first leg angle to a first leg segment, wherein the second frame member includes a second central segment connected at a second nonzero arm angle to a second arm segment and connected at a second leg angle to a second leg segment, wherein the first leg segment has a first distal end and a first distal leg portion adjacent the first distal end, and wherein the second leg segment has a second distal end and a second distal leg portion adjacent the second distal end; a frame connector positioned to connect directly or indirectly to the first frame member and the second frame member, wherein the first distal leg portion is directly or indirectly connected to the frame connector in a manner to permit relative movement between the frame connector and the first distal leg portion, and wherein the second distal leg portion is directly or indirectly connected to the frame connector in a manner to permit relative movement between the frame connector and the second distal leg portion; and a toolless-release mechanism configured for securing the bike carrier directly or indirectly to the vehicle.

In some additional, alternative, or selectively cumulative embodiments, a bike carrier configured for direct or indirect connection to a vehicle comprises: a carrier frame including a first frame member and a second frame member, wherein the first frame member includes a first central segment connected at a first nonzero arm angle to a first arm segment and connected at a first leg angle to a first leg segment, wherein the second frame member includes a second central segment connected at a second nonzero arm angle to a second arm segment and connected at a second leg angle to a second leg segment, wherein the first leg segment has a first distal end and a first distal leg portion adjacent the first distal end, and wherein the second leg segment has a second distal end and a second distal leg portion adjacent the second distal end; a variable frame connection mechanism that directly or indirectly connects the first frame member to the second frame member, wherein the variable frame connection mechanism permits a variable distance between the first arm segment and the second arm segment; and a toolless-release mechanism configured for securing the bike carrier directly or indirectly to the vehicle.

In some additional, alternative, or selectively cumulative embodiments, a bike carrier configured for direct or indirect connection to a vehicle comprises: a carrier frame including a first frame member and a second frame member, wherein the first frame member includes a first central segment connected at a first nonzero arm angle to a first arm segment and connected at a first leg angle to a first leg segment, wherein the second frame member includes a second central segment connected at a second nonzero arm angle to a second arm segment and connected at a second leg angle to a second leg segment, wherein the first leg segment has a first distal end and a first distal leg portion adjacent the first distal end, and wherein the second leg segment has a second distal end and a second distal leg portion adjacent the second distal end; a variable frame connection means for directly or indirectly connecting the first frame member to the second frame member and for permitting a variable distance between the first arm segment and the second arm segment; and a toolless-release mechanism configured for securing the bike carrier directly or indirectly to the vehicle.

In some additional, alternative, or selectively cumulative embodiments, a bike carrier configured for direct or indirect connection to a vehicle structure comprises: a carrier frame including a first frame member and a second frame member, wherein the first frame member includes a first upper segment and a first lower segment, wherein the second frame member includes a second upper segment and a second lower segment, wherein the first upper segment has a first upper proximal end portion and first upper distal end portion, wherein the second upper segment has a second upper proximal end portion and a second upper distal end portion, wherein the first lower segment has a first lower proximal end portion and a first lower distal end portion, wherein the second lower segment has a second lower proximal end portion and a second lower distal end portion, wherein the first upper proximal end portion is closer to the first lower proximal end portion than to the first distal lower end portion, wherein the second upper proximal end portion is closer to the second lower proximal end portion than to the second distal lower end portion, wherein the first upper proximal end portion and the first lower proximal end portion diverge at a first nonzero arm angle, and wherein the second upper proximal end portion and the second lower proximal end portion diverge at a second nonzero arm angle; a variable frame connection mechanism that directly or indirectly connects the first frame member to the second frame member, wherein the variable frame connection mechanism permits a variable distance between the first upper distal end portion of the first upper segment and the second upper distal end portion of the second upper segment, such that the first upper distal end portion and the second upper distal end portion are configurable to an upper end distance that is greater than a lower end distance between the first lower distal end portion and the second lower distal end portion; and a quick-release mechanism connected directly or indirectly to the carrier frame, wherein the quick-release mechanism is configured for securing the carrier frame directly or indirectly to the vehicle structure.

In some additional, alternative, or selectively cumulative embodiments, a kit for assembly of a bike carrier, comprises: a first frame member including a first central segment connected at a first nonzero arm angle to a first arm segment and connected at a first leg angle to a first leg segment, wherein the first leg segment has a first distal end and a first distal leg portion adjacent the first distal end; a second frame member including a second central segment connected at a second nonzero arm angle to a second arm segment and connected at a second leg angle to a second leg segment, wherein the second leg segment has a second distal end and a second distal leg portion adjacent the second distal end; a variable frame connection mechanism that is configured to directly or indirectly connect the first frame member to the second frame member in a manner that permits a variable distance between the first arm segment and the second arm segment; and a quick-release mechanism configured for continuous direct or indirect attachment to the variable frame connection mechanism, wherein the quick-release mechanism is configured for securing the variable frame connection mechanism directly or indirectly to a vehicle.

In some additional, alternative, or selectively cumulative embodiments, a bike carrier, configured for placement about a vehicle structure having first and second spaced-apart generally horizontal structural members connected to a vehicle, comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the second frame member includes a second arm segment directly or indirectly connected to a second leg segment, and wherein the second arm segment and the second leg segment are generally oriented at a second frame angle, a frame connector positioned to connect directly or indirectly to the first frame member and the second frame member; and a quick-release mechanism configured for securing the bike carrier to one of the first and second generally horizontal structural members.

In some additional, alternative, or selectively cumulative embodiments, a bike carrier, configured for placement about a vehicle structure having first and second spaced-apart generally horizontal structural members connected to a vehicle, comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the second frame member includes a second arm segment directly or indirectly connected to a second leg segment, and wherein the second arm segment and the second leg segment are generally oriented at a second frame angle, a frame connector positioned to connect directly or indirectly to the first frame member and the second frame member; and a quick-release means configured for securing the bike carrier to one of the first and second generally horizontal structural members.

In some additional, alternative, or selectively cumulative embodiments, a bike carrier configured for direct or indirect connection to a vehicle comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the second frame member includes a second arm segment directly or indirectly connected to a second leg segment, wherein the second arm segment and the second leg segment are generally oriented at a second frame angle, wherein the first leg segment has a first distal end and a first distal leg portion adjacent the first distal end, and wherein the second leg segment has a second distal end and a second distal leg portion adjacent the second distal end; a frame connector positioned to connect directly or indirectly to the first frame member and the second frame member, wherein the first distal leg portion is directly or indirectly connected to the frame connector in a manner to permit relative movement between the frame connector and the first distal leg portion, and wherein the second distal leg portion is directly or indirectly connected to the frame connector in a manner to permit relative movement between the frame connector and the second distal leg portion; and a quick-release mechanism configured for securing the bike carrier directly or indirectly to the vehicle.

In some additional, alternative, or selectively cumulative embodiments, a bike carrier configured for direct or indirect connection to a vehicle comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the second frame member includes a second arm segment directly or indirectly connected to a second leg segment, wherein the second arm segment and the second leg segment are generally oriented at a second frame angle, wherein the first leg segment has a first distal end and a first distal leg portion adjacent the first distal end, and wherein the second leg segment has a second distal end and a second distal leg portion adjacent the second distal end; a variable frame connection mechanism that directly or indirectly connects the first frame member to the second frame member, wherein the variable frame connection mechanism permits a variable distance between the first arm segment and the second arm segment; and a quick-release mechanism configured for securing the bike carrier directly or indirectly to the vehicle.

In some additional, alternative, or selectively cumulative embodiments, a bike carrier configured for direct or indirect connection to a vehicle comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the second frame member includes a second arm segment directly or indirectly connected to a second leg segment, wherein the second arm segment and the second leg segment are generally oriented at a second frame angle, wherein the first leg segment has a first distal end and a first distal leg portion adjacent the first distal end, and wherein the second leg segment has a second distal end and a second distal leg portion adjacent the second distal end; a variable frame connection means for directly or indirectly connecting the first frame member to the second frame member and for permitting a variable distance between the first arm segment and the second arm segment; and a quick-release mechanism configured for securing the bike carrier directly or indirectly to the vehicle.

In some additional, alternative, or selectively cumulative embodiments, a bike carrier, configured for placement about a vehicle structure having first and second spaced-apart generally horizontal structural members connected to a vehicle, comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the second frame member includes a second arm segment directly or indirectly connected to a second leg segment, and wherein the second arm segment and the second leg segment are generally oriented at a second frame angle; a frame connector positioned to connect directly or indirectly to the first frame member and the second frame member; and a toolless-release mechanism configured for securing the bike carrier to one of the first and second generally horizontal structural members.

In some additional, alternative, or selectively cumulative embodiments, a bike carrier, configured for placement about a vehicle structure having first and second spaced-apart generally horizontal structural members connected to a vehicle, comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the second frame member includes a second arm segment directly or indirectly connected to a second leg segment, and wherein the second arm segment and the second leg segment are generally oriented at a second frame angle; a frame connector positioned to connect directly or indirectly to the first frame member and the second frame member; and a toolless-release means configured for securing the bike carrier to one of the first and second generally horizontal structural members.

In some additional, alternative, or selectively cumulative embodiments, a bike carrier configured for direct or indirect connection to a vehicle comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the second frame member includes a second arm segment directly or indirectly connected to a second leg segment, and wherein the second arm segment and the second leg segment are generally oriented at a second frame angle, wherein the first leg segment has a first distal end and a first distal leg portion adjacent the first distal end, and wherein the second leg segment has a second distal end and a second distal leg portion adjacent the second distal end; a frame connector positioned to connect directly or indirectly to the first frame member and the second frame member, wherein the first distal leg portion is directly or indirectly connected to the frame connector in a manner to permit relative movement between the frame connector and the first distal leg portion, and wherein the second distal leg portion is directly or indirectly connected to the frame connector in a manner to permit relative movement between the frame connector and the second distal leg portion; and a toolless-release mechanism configured for securing the bike carrier directly or indirectly to the vehicle.

In some additional, alternative, or selectively cumulative embodiments, a bike carrier configured for direct or indirect connection to a vehicle comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the second frame member includes a second arm segment directly or indirectly connected to a second leg segment, and wherein the second arm segment and the second leg segment are generally oriented at a second frame angle, wherein the first leg segment has a first distal end and a first distal leg portion adjacent the first distal end, and wherein the second leg segment has a second distal end and a second distal leg portion adjacent the second distal end; a variable frame connection mechanism that directly or indirectly connects the first frame member to the second frame member, wherein the variable frame connection mechanism permits a variable distance between the first arm segment and the second arm segment; and a toolless-release mechanism configured for securing the bike carrier directly or indirectly to the vehicle.

In some additional, alternative, or selectively cumulative embodiments, a bike carrier configured for direct or indirect connection to a vehicle comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the second frame member includes a second arm segment directly or indirectly connected to a second leg segment, and wherein the second arm segment and the second leg segment are generally oriented at a second frame angle, wherein the first leg segment has a first distal end and a first distal leg portion adjacent the first distal end, and wherein the second leg segment has a second distal end and a second distal leg portion adjacent the second distal end; a variable frame connection means for directly or indirectly connecting the first frame member to the second frame member and for permitting a variable distance between the first arm segment and the second arm segment; and a toolless-release mechanism configured for securing the bike carrier directly or indirectly to the vehicle.

In some additional, alternative, or selectively cumulative embodiments, a bike carrier configured for direct or indirect connection to a vehicle structure comprises: a carrier frame including a first frame member and a second frame member, wherein the first frame member includes a first upper segment and a first lower segment, wherein the second frame member includes a second upper segment and a second lower segment, wherein the first upper segment has a first upper proximal end portion and first upper distal end portion, wherein the second upper segment has a second upper proximal end portion and a second upper distal end portion, wherein the first lower segment has a first lower proximal end portion and a first lower distal end portion, wherein the second lower segment has a second lower proximal end portion and a second lower distal end portion, wherein the first upper proximal end portion is closer to the first lower proximal end portion than to the first distal lower end portion, wherein the second upper proximal end portion is closer to the second lower proximal end portion than to the second distal lower end portion, wherein the first upper proximal end portion and the first lower proximal end portion diverge at a first nonzero arm angle, and wherein the second upper proximal end portion and the second lower proximal end portion diverge at a second nonzero arm angle; a variable frame connection mechanism that directly or indirectly connects the first frame member to the second frame member, wherein the variable frame connection mechanism permits a variable distance between the first upper distal end portion of the first upper segment and the second upper distal end portion of the second upper segment, such that the first upper distal end portion and the second upper distal end portion are configurable to an upper end distance that is greater than a lower end distance between the first lower distal end portion and the second lower distal end portion; and a quick-release mechanism configured for securing the carrier frame directly or indirectly to the vehicle structure.

In some additional, alternative, or selectively cumulative embodiments, a kit for assembly of a bike carrier comprises: a first frame member includes a first arm segment directly or indirectly connected to a first leg segment, wherein the first arm segment and the first leg segment are generally oriented at a first frame angle, and wherein the first leg segment has a first distal end and a first distal leg portion adjacent the first distal end; a second frame member includes a second arm segment directly or indirectly connected to a second leg segment, and wherein the second arm segment and the second leg segment are generally oriented at a second frame angle, wherein the second leg segment has a second distal end and a second distal leg portion adjacent the second distal end; a variable frame connection mechanism that is configured to directly or indirectly connect the first frame member to the second frame member in a manner that permits a variable distance between the first arm segment and the second arm segment; and a quick-release mechanism configured for securing the variable frame connection mechanism, the first frame member, or the second frame member directly or indirectly to a vehicle.

In some additional, alternative, or selectively cumulative embodiments, a bike carrier, configured for placement about a vehicle structure having first and second spaced-apart generally horizontal structural members connected to a vehicle, comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the first frame member optionally includes a first central segment connected directly or indirectly between the first arm segment and the first leg segment, wherein the second frame member includes a second arm segment directly or indirectly connected to a second leg segment, wherein the second arm segment and the second leg segment are generally oriented at a second frame angle, and wherein the second frame member optionally includes a second central segment connected directly or indirectly between the second arm segment and the second leg segment; a frame connector positioned to connect directly or indirectly to the first frame member and the second frame member; and a quick-release mechanism configured for securing the bike carrier to one of the first and second generally horizontal structural members.

In some additional, alternative, or selectively cumulative embodiments, a bike carrier, configured for placement about a vehicle structure having first and second spaced-apart and generally horizontal structural members connected to a vehicle, comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the first frame member optionally includes a first central segment connected directly or indirectly between the first arm segment and the first leg segment, wherein the second frame member includes a second arm segment directly or indirectly connected to a second leg segment, wherein the second arm segment and the second leg segment are generally oriented at a second frame angle, and wherein the second frame member optionally includes a second central segment connected directly or indirectly between the second arm segment and the second leg segment; a frame connector positioned to connect directly or indirectly to the first frame member and the second frame member; and a quick-release means configured for securing the bike carrier to one of the first and second generally horizontal structural members.

In some additional, alternative, or selectively cumulative embodiments, a bike carrier configured for direct or indirect connection to a vehicle comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the first frame member optionally includes a first central segment connected directly or indirectly between the first arm segment and the first leg segment, wherein the second frame member includes a second arm segment directly or indirectly connected to a second leg segment, wherein the second arm segment and the second leg segment are generally oriented at a second frame angle, wherein the second frame member optionally includes a second central segment connected directly or indirectly between the second arm segment and the second leg segment, wherein the first leg segment has a first distal end and a first distal leg portion adjacent the first distal end, and wherein the second leg segment has a second distal end and a second distal leg portion adjacent the second distal end; a frame connector positioned to connect directly or indirectly to the first frame member and the second frame member, wherein the first distal leg portion is directly or indirectly connected to the frame connector in a manner to permit relative movement between the frame connector and the first distal leg portion, and wherein the second distal leg portion is directly or indirectly connected to the frame connector in a manner to permit relative movement between the frame connector and the second distal leg portion; and a quick-release mechanism configured for securing the bike carrier directly or indirectly to the vehicle.

In some additional, alternative, or selectively cumulative embodiments, a bike carrier configured for direct or indirect connection to a vehicle comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the first frame member optionally includes a first central segment connected directly or indirectly between the first arm segment and the first leg segment, wherein the second frame member includes a second arm segment directly or indirectly connected to a second leg segment, wherein the second arm segment and the second leg segment are generally oriented at a second frame angle, wherein the second frame member optionally includes a second central segment connected directly or indirectly between the second arm segment and the second leg segment, wherein the first leg segment has a first distal end and a first distal leg portion adjacent the first distal end, and wherein the second leg segment has a second distal end and a second distal leg portion adjacent the second distal end; a variable frame connection mechanism that directly or indirectly connects the first frame member to the second frame member, wherein the variable frame connection mechanism permits a variable distance between the first arm segment and the second arm segment; and a quick-release mechanism configured for securing the bike carrier directly or indirectly to the vehicle.

In some additional, alternative, or selectively cumulative embodiments, a bike carrier configured for direct or indirect connection to a vehicle comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the first frame member optionally includes a first central segment connected directly or indirectly between the first arm segment and the first leg segment, wherein the second frame member includes a second arm segment directly or indirectly connected to a second leg segment, wherein the second arm segment and the second leg segment are generally oriented at a second frame angle, wherein the second frame member optionally includes a second central segment connected directly or indirectly between the second arm segment and the second leg segment, wherein the first leg segment has a first distal end and a first distal leg portion adjacent the first distal end, and wherein the second leg segment has a second distal end and a second distal leg portion adjacent the second distal end; a variable frame connection means for directly or indirectly connecting the first frame member to the second frame member and for permitting a variable distance between the first arm segment and the second arm segment; and a quick-release mechanism configured for securing the bike carrier directly or indirectly to the vehicle.

In some additional, alternative, or selectively cumulative embodiments, a bike carrier, configured for placement about a vehicle structure having first and second spaced-apart and generally horizontal structural members connected to a vehicle, comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the first frame member optionally includes a first central segment connected directly or indirectly between the first arm segment and the first leg segment, wherein the second frame member includes a second arm segment directly or indirectly connected to a second leg segment, wherein the second arm segment and the second leg segment are generally oriented at a second frame angle, and wherein the second frame member optionally includes a second central segment connected directly or indirectly between the second arm segment and the second leg segment; a frame connector positioned to connect directly or indirectly to the first frame member and the second frame member; and a toolless-release mechanism configured for securing the bike carrier to one of the first and second generally horizontal structural members.

In some additional, alternative, or selectively cumulative embodiments, a bike carrier, configured for placement about a vehicle structure having first and second spaced-apart and generally horizontal structural members connected to a vehicle, comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the first frame member optionally includes a first central segment connected directly or indirectly between the first arm segment and the first leg segment, wherein the second frame member includes a second arm segment directly or indirectly connected to a second leg segment, wherein the second arm segment and the second leg segment are generally oriented at a second frame angle, and wherein the second frame member optionally includes a second central segment connected directly or indirectly between the second arm segment and the second leg segment; a frame connector positioned to connect directly or indirectly to the first frame member and the second frame member; and a toolless-release means configured for securing the bike carrier to one of the first and second generally horizontal structural members.

In some additional, alternative, or selectively cumulative embodiments, a bike carrier configured for direct or indirect connection to a vehicle comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the first frame member optionally includes a first central segment connected directly or indirectly between the first arm segment and the first leg segment, wherein the second frame member includes a second arm segment directly or indirectly connected to a second leg segment, wherein the second arm segment and the second leg segment are generally oriented at a second frame angle, wherein the second frame member optionally includes a second central segment connected directly or indirectly between the second arm segment and the second leg segment, wherein the first leg segment has a first distal end and a first distal leg portion adjacent the first distal end, and wherein the second leg segment has a second distal end and a second distal leg portion adjacent the second distal end; a frame connector positioned to connect directly or indirectly to the first frame member and the second frame member, wherein the first distal leg portion is directly or indirectly connected to the frame connector in a manner to permit relative movement between the frame connector and the first distal leg portion, and wherein the second distal leg portion is directly or indirectly connected to the frame connector in a manner to permit relative movement between the frame connector and the second distal leg portion; and a toolless-release mechanism configured for securing the bike carrier directly or indirectly to the vehicle.

In some additional, alternative, or selectively cumulative embodiments, a bike carrier configured for direct or indirect connection to a vehicle comprises: a carrier frame including a first frame member and a second frame member, wherein the first frame member includes a first arm segment directly or indirectly connected to a first leg segment, wherein the first arm segment and the first leg segment are generally oriented at a first frame angle, wherein the first frame member optionally includes a first central segment connected directly or indirectly between the first arm segment and the first leg segment, wherein the second frame member includes a second arm segment directly or indirectly connected to a second leg segment, wherein the second arm segment and the second leg segment are generally oriented at a second frame angle, wherein the second frame member optionally includes a second central segment connected directly or indirectly between the second arm segment and the second leg segment, wherein the first leg segment has a first distal end and a first distal leg portion adjacent the first distal end, and wherein the second leg segment has a second distal end and a second distal leg portion adjacent the second distal end; a variable frame connection mechanism that directly or indirectly connects the first frame member to the second frame member, wherein the variable frame connection mechanism permits a variable distance between the first arm segment and the second arm segment; and a toolless-release mechanism configured for securing the bike carrier directly or indirectly to the vehicle.

In some additional, alternative, or selectively cumulative embodiments, a bike carrier configured for direct or indirect connection to a vehicle comprising: a carrier frame including a first frame member and a second frame member, wherein the first frame member includes a first arm segment directly or indirectly connected to a first leg segment, wherein the first arm segment and the first leg segment are generally oriented at a first frame angle, wherein the first frame member optionally includes a first central segment connected directly or indirectly between the first arm segment and the first leg segment, wherein the second frame member includes a second arm segment directly or indirectly connected to a second leg segment, wherein the second arm segment and the second leg segment are generally oriented at a second frame angle, wherein the second frame member optionally includes a second central segment connected directly or indirectly between the second arm segment and the second leg segment, wherein the first leg segment has a first distal end and a first distal leg portion adjacent the first distal end, and wherein the second leg segment has a second distal end and a second distal leg portion adjacent the second distal end; a variable frame connection means for directly or indirectly connecting the first frame member to the second frame member and for permitting a variable distance between the first arm segment and the second arm segment; and a toolless-release mechanism configured for securing the bike carrier directly or indirectly to the vehicle.

In some additional, alternative, or selectively cumulative embodiments, a kit for assembly of a bike carrier comprises: a first frame member including a first arm segment directly or indirectly connected to a first leg segment, wherein the first arm segment and the first leg segment are generally oriented at a first frame angle, wherein the first frame member optionally includes a first central segment connected directly or indirectly between the first arm segment and the first leg segment, and wherein the first leg segment has a first distal end and a first distal leg portion adjacent the first distal end; a second frame member including a second arm segment directly or indirectly connected to a second leg segment, and wherein the second arm segment and the second leg segment are generally oriented at a second frame angle, wherein the second frame member optionally includes a second central segment connected directly or indirectly between the second arm segment and the second leg segment, and wherein the second leg segment has a second distal end and a second distal leg portion adjacent the second distal end; a variable frame connection mechanism that is configured to directly or indirectly connect the first frame member to the second frame member in a manner that permits a variable distance between the first arm segment and the second arm segment; and a quick-release mechanism configured for securing the variable frame connection mechanism, the first frame member, or the second frame member directly or indirectly to a vehicle.

In some additional, alternative, or selectively cumulative embodiments, the first frame member includes a first central segment connected directly or indirectly between the first arm segment and the first leg segment, wherein the first arm segment and the first central segment or the first leg segment are generally oriented at a first arm angle, wherein the second frame member includes a second central segment connected directly or indirectly between the second arm segment and the second leg segment, and wherein the second arm segment and the second central segment or the second leg segment are generally oriented at a second arm angle.

In some additional, alternative, or selectively cumulative embodiments, the quick-release mechanism is positioned in proximity to the frame connector.

In some additional, alternative, or selectively cumulative embodiments, the toolless-release mechanism is positioned in proximity to the frame connector.

In some additional, alternative, or selectively cumulative embodiments, a first arm angle constitutes a first frame angle, or a first frame angle constitutes a first arm angle.

In some additional, alternative, or selectively cumulative embodiments, wherein the first central segment and the first leg segment are generally oriented at a first leg angle.

In some additional, alternative, or selectively cumulative embodiments, the first upper segment comprises a first arm segment and the second upper segment comprises a second arm segment.

In some additional, alternative, or selectively cumulative embodiments, the first lower segment comprises a first central segment or a first leg segment, and the second lower segment comprises a second central segment or a second leg segment.

In some additional, alternative, or selectively cumulative embodiments, the first upper segment is directly or indirectly connected to the first lower segment and/or the second upper segment is directly or indirectly connected to the second lower segment.

In some additional, alternative, or selectively cumulative embodiments, the first central segment is connected directly or indirectly between the first upper segment and the first lower segment and/or wherein the second central segment is connected directly or indirectly between the second upper segment and the second lower segment.

In some additional, alternative, or selectively cumulative embodiments, at least two of the first central segment, the first arm segment, and the first leg segment are formed as a single integrated component.

In some additional, alternative, or selectively cumulative embodiments, the first central segment, the first arm segment, and the first leg segment are formed as a single integrated component.

In some additional, alternative, or selectively cumulative embodiments, the carrier frame is bilaterally symmetrical.

In some additional, alternative, or selectively cumulative embodiments, the first frame angle and/or the second frame angle are fixed.

In some additional, alternative, or selectively cumulative embodiments, the first frame angle and/or the second frame angle are adjustable.

In some additional, alternative, or selectively cumulative embodiments, the first frame angle is the smallest angle between the first arm segment and the first leg segment, and wherein the first frame angle is smaller than or equal to 90 degrees.

In some additional, alternative, or selectively cumulative embodiments, the first frame angle is the smallest angle between the first arm segment and the first leg segment, and wherein the first frame angle is smaller than or equal to 60 degrees.

In some additional, alternative, or selectively cumulative embodiments, the first frame angle is the smallest angle between the first arm segment and the first leg segment, and wherein the first frame angle is smaller than or equal to 45 degrees.

In some additional, alternative, or selectively cumulative embodiments, the first frame angle is the smallest angle between the first arm segment and the first leg segment, and wherein the first frame angle is smaller than or equal to 40 degrees.

In some additional, alternative, or selectively cumulative embodiments, the first frame angle is the smallest angle between the first arm segment and the first leg segment, and wherein the first frame angle is greater than or equal to 25 degrees.

In some additional, alternative, or selectively cumulative embodiments, the first frame angle is the smallest angle between the first arm segment and the first leg segment, and wherein the first frame angle is greater than or equal to 30 degrees.

In some additional, alternative, or selectively cumulative embodiments, the first frame angle is the smallest angle between the first arm segment and the first leg segment, and wherein the first frame angle is greater than or equal to 35 degrees.

In some additional, alternative, or selectively cumulative embodiments, the first frame angle is the smallest angle between the first arm segment and the first leg segment, and wherein the first frame angle is collapsible to less than or equal to 10 degrees.

In some additional, alternative, or selectively cumulative embodiments, the first frame angle is the smallest angle between the first arm segment and the first leg segment, and wherein the first frame angle is collapsible to less than or equal to 5 degrees.

In some additional, alternative, or selectively cumulative embodiments, at least one of the first arm angle and the first leg angle are fixed.

In some additional, alternative, or selectively cumulative embodiments, both of the first arm angle and the first leg angle are fixed.

In some additional, alternative, or selectively cumulative embodiments, at least one of the first arm angle and the first leg angle are adjustable.

In some additional, alternative, or selectively cumulative embodiments, both of the first arm angle and the first leg angle are adjustable.

In some additional, alternative, or selectively cumulative embodiments, the first arm angle is the smallest angle between the first central segment and the first arm segment, and wherein the first arm angle is smaller than or equal to 90 degrees.

In some additional, alternative, or selectively cumulative embodiments, the first arm angle is the smallest angle between the first central segment and the first arm segment, and wherein the first arm angle is smaller than or equal to 60 degrees.

In some additional, alternative, or selectively cumulative embodiments, the first arm angle is the smallest angle between the first central segment and the first arm segment, and wherein the first arm angle is smaller than or equal to 45 degrees.

In some additional, alternative, or selectively cumulative embodiments, the first arm angle is the smallest angle between the first central segment and the first arm segment, and wherein the first arm angle is smaller than or equal to 40 degrees.

In some additional, alternative, or selectively cumulative embodiments, the first arm angle is the smallest angle between the first central segment and the first arm segment, and wherein the first arm angle is greater than or equal to 25 degrees.

In some additional, alternative, or selectively cumulative embodiments, the first arm angle is the smallest angle between the first central segment and the first arm segment, and wherein the first arm angle is greater than or equal to 30 degrees.

In some additional, alternative, or selectively cumulative embodiments, the first arm angle is the smallest angle between the first central segment and the first arm segment, and wherein the first arm angle is greater than or equal to 35 degrees.

In some additional, alternative, or selectively cumulative embodiments, the first arm angle is the smallest angle between the first central segment and the first arm segment, and wherein the first arm angle is collapsible to less than or equal to 10 degrees.

In some additional, alternative, or selectively cumulative embodiments, the first arm angle is the smallest angle between the first central segment and the first arm segment, and wherein the first arm angle is collapsible to less than or equal to 5 degrees.

In some additional, alternative, or selectively cumulative embodiments, the first leg angle is the smallest angle between the first central segment and the first leg segment, and wherein the first leg angle is smaller than or equal to 160 degrees.

In some additional, alternative, or selectively cumulative embodiments, the first leg angle is the smallest angle between the first central segment and the first leg segment, and wherein the first leg angle is smaller than or equal to 150 degrees.

In some additional, alternative, or selectively cumulative embodiments, the first leg angle is the smallest angle between the first central segment and the first leg segment, and wherein the first leg angle is smaller than or equal to 140 degrees.

In some additional, alternative, or selectively cumulative embodiments, the first leg angle is the smallest angle between the first central segment and the first leg segment, and wherein the first leg angle is greater than or equal to 100 degrees.

In some additional, alternative, or selectively cumulative embodiments, the first leg angle is the smallest angle between the first central segment and the first leg segment, and wherein the first leg angle is greater than or equal to 110 degrees.

In some additional, alternative, or selectively cumulative embodiments, the first leg angle is the smallest angle between the first central segment and the first leg segment, and wherein the first leg angle is greater than or equal to 120 degrees.

In some additional, alternative, or selectively cumulative embodiments, the first leg angle is the smallest angle between the first central segment and the first leg segment, and wherein the first leg angle is collapsible to less than or equal to 10 degrees.

In some additional, alternative, or selectively cumulative embodiments, the first leg angle is the smallest angle between the first central segment and the first leg segment, and wherein the first leg angle is collapsible to less than or equal to 5 degrees.

In some additional, alternative, or selectively cumulative embodiments, the first central segment and the first leg segment are aligned in a straight line.

In some additional, alternative, or selectively cumulative embodiments, at least one of the first central segment, the first arm segment, the first leg segment, the second central segment, the second arm segment, and the second leg segment comprises a metal.

In some additional, alternative, or selectively cumulative embodiments, the first central segment, the first arm segment, the first leg segment, the second central segment, the second arm segment, and the second leg segment all comprise a metal.

In some additional, alternative, or selectively cumulative embodiments, at least one of the first central segment, the first arm segment, the first leg segment, the second central segment, the second arm segment, and the second leg segment comprises a polymer.

In some additional, alternative, or selectively cumulative embodiments, the first central segment, the first arm segment, the first leg segment, the second central segment, the second arm segment, and the second leg segment all comprise a polymer.

In some additional, alternative, or selectively cumulative embodiments, at least one of the first central segment, the first arm segment, the first leg segment, the second central segment, the second arm segment, and the second leg segment comprises a polycarbonate.

In some additional, alternative, or selectively cumulative embodiments, the first central segment, the first arm segment, the first leg segment, the second central segment, the second arm segment, and the second leg segment all comprise a polycarbonate.

In some additional, alternative, or selectively cumulative embodiments, at least one of the first central segment, the first arm segment, the first leg segment, the second central segment, the second arm segment, and the second leg segment comprises an extruded material In some additional, alternative, or selectively cumulative embodiments, at least one of the first central segment, the first arm segment, the first leg segment, the second central segment, the second arm segment, and the second leg segment is formed in a molding or casting process.

In some additional, alternative, or selectively cumulative embodiments, the frame connector comprises a discrete bracket that is configured to connect the first leg segment to the second leg segment.

In some additional, alternative, or selectively cumulative embodiments, the frame connector comprises a foot segment that is configured to connect the first leg segment to the second leg segment.

In some additional, alternative, or selectively cumulative embodiments, the first central segment, the first arm segment, the first leg segment, and the frame connector are formed as a single integrated component.

In some additional, alternative, or selectively cumulative embodiments, the first frame member, the second frame member, and the frame connector are formed as a single integrated component.

In some additional, alternative, or selectively cumulative embodiments, the frame connector comprises one or more bumper spacers.

In some additional, alternative, or selectively cumulative embodiments, the quick-release mechanism is connected to the frame connector.

In some additional, alternative, or selectively cumulative embodiments, the quick-release mechanism comprises a securement strap.

In some additional, alternative, or selectively cumulative embodiments, the quick-release mechanism comprises a securement strap made of a flexible material.

In some additional, alternative, or selectively cumulative embodiments, the quick-release mechanism comprises a securement strap and a catch.

In some additional, alternative, or selectively cumulative embodiments, the quick-release mechanism comprises a post and a flexible securement strap with catch holes configured to fit around the post.

In some additional, alternative, or selectively cumulative embodiments, the quick-release mechanism comprises mating hook and loop fasteners.

In some additional, alternative, or selectively cumulative embodiments, the quick-release mechanism comprises mated Velcro fasteners.

In some additional, alternative, or selectively cumulative embodiments, the quick-release mechanism comprises a strap and a squeeze buckle.

In some additional, alternative, or selectively cumulative embodiments, the quick-release mechanism comprises a strap and a side-release squeeze buckle.

In some additional, alternative, or selectively cumulative embodiments, the quick-release mechanism comprises a hole and spring pin.

In some additional, alternative, or selectively cumulative embodiments, the quick-release mechanism is configured for a human of average dexterity to engage within 10 seconds and for a human of average dexterity to disengage within 20 seconds.

In some additional, alternative, or selectively cumulative embodiments, the quick-release mechanism is configured for a human of average dexterity to engage within 10 seconds and for a human of average dexterity to disengage within 10 seconds.

In some additional, alternative, or selectively cumulative embodiments, the quick-release mechanism comprises a toolless-release mechanism.

In some additional, alternative, or selectively cumulative embodiments, the quick-release mechanism comprises an engagement and disengagement mechanism that is configured for a human of average dexterity to engage and disengage without use of an auxiliary tool.

In some additional, alternative, or selectively cumulative embodiments, the quick-release mechanism is configured to engage a second horizontal structural member of the vehicle structure.

In some additional, alternative, or selectively cumulative embodiments, the vehicle structure has a third generally horizontal structural member connected to the vehicle, and wherein the generally third horizontal structural member is spaced apart from the first and second generally horizontal structural members.

In some additional, alternative, or selectively cumulative embodiments, the quick-release mechanism is configured to engage a third horizontal structural member of the vehicle structure.

In some additional, alternative, or selectively cumulative embodiments, the first arm angle defines a first arm bend that is configured to engage the first horizontal structural member.

In some additional, alternative, or selectively cumulative embodiments, the vehicle structure has a third generally horizontal structural member connected to the vehicle, wherein the generally third horizontal structural member is spaced apart from the first and second generally horizontal structural members, and wherein the first leg angle defines a first leg bend that is configured to engage the second horizontal structural member, and wherein the quick-release mechanism is configured to engage a third horizontal structural member of the vehicle structure.

In some additional, alternative, or selectively cumulative embodiments, engagement with a horizontal structural member comprises contact of the structural member within 2 inches of a vertex of the leg angle of the frame member.

In some additional, alternative, or selectively cumulative embodiments, engagement with a horizontal structural member comprises contact of the structural member within 2 inches of a vertex of the arm angle of the frame member.

In some additional, alternative, or selectively cumulative embodiments, the first arm angle defines a first arm bend in the first frame member, wherein the first leg angle defines a first leg bend in the first frame member, and wherein at least one of the first arm bend and the first leg bend is covered by a protective material.

In some additional, alternative, or selectively cumulative embodiments, the first arm angle defines a first arm bend in the first frame member, wherein the first leg angle defines a first leg bend in the first frame member, and wherein at least one of the first arm bend and the first leg bend is covered by a foam sleeve.

In some additional, alternative, or selectively cumulative embodiments, at least one of the horizontal structural members comprises a rail.

In some additional, alternative, or selectively cumulative embodiments, at least one of the horizontal structural members comprises a circular cross-section.

In some additional, alternative, or selectively cumulative embodiments, at least one of the horizontal structural members comprises a rectangular cross-section.

In some additional, alternative, or selectively cumulative embodiments, at least one of the horizontal structural members comprises a square cross-section.

In some additional, alternative, or selectively cumulative embodiments, the vehicle structure comprises a bumper.

In some additional, alternative, or selectively cumulative embodiments, the vehicle structure comprises a front bumper.

In some additional, alternative, or selectively cumulative embodiments, the vehicle structure comprises a push bumper.

In some additional, alternative, or selectively cumulative embodiments, the vehicle structure comprises a Setina push bumper In some additional, alternative, or selectively cumulative embodiments, the vehicle comprises a law enforcement vehicle.

In some additional, alternative, or selectively cumulative embodiments, the first leg segment is pivotally connected to the frame connector.

In some additional, alternative, or selectively cumulative embodiments, the second leg segment is pivotally connected to the frame connector.

In some additional, alternative, or selectively cumulative embodiments, the first leg segment is pivotally connected to the frame connector, and wherein the second leg segment is pivotally connected to the frame connector.

In some additional, alternative, or selectively cumulative embodiments, the first arm segment and the second arm segment are separated by a variable distance.

In some additional, alternative, or selectively cumulative embodiments, the first arm segment and the second arm segment are separated by a toolless variable distance.

In some additional, alternative, or selectively cumulative embodiments, the first arm segment and the second arm segment are separated by a toolless variable distance that has a range that is greater than or equal to 12 inches (30.5 cm).

In some additional, alternative, or selectively cumulative embodiments, the first arm segment and the second arm segment are separated by a toolless variable distance that has a range that is greater than or equal to 18 inches (45.7 cm).

In some additional, alternative, or selectively cumulative embodiments, the first arm segment and the second arm segment are separated by a toolless variable distance that has a range that is greater than or equal to 20 inches (51 cm).

In some additional, alternative, or selectively cumulative embodiments, the first arm segment and the second arm segment are separated by a toolless variable distance that has a range that is greater than or equal to 23 inches (58 cm).

In some additional, alternative, or selectively cumulative embodiments, the first arm segment and the second arm segment are separated by a toolless variable distance that has a range that spans from less than or equal to three inches (7.5 cm) to greater than or equal to 18 inches (45.7 cm).

In some additional, alternative, or selectively cumulative embodiments, the first arm segment and the second arm segment are separated by a toolless variable distance that has a range that spans from zero inches (0 cm) to greater than or equal to 18 inches (45.7 cm).

In some additional, alternative, or selectively cumulative embodiments, the first arm segment and the second arm segment are separated by a toolless variable distance that has a range that spans from less than or equal to 1 inch (7.5 cm) to greater than or equal to 20 inches (51 cm).

In some additional, alternative, or selectively cumulative embodiments, the first arm segment and the second arm segment are separated by a toolless variable distance that has a range that spans from zero inches (0 cm) to greater than or equal to 18 inches (45.7 cm).

In some additional, alternative, or selectively cumulative embodiments, the bike carrier has a central axis positioned between the first leg segment and the second leg segment, wherein at least one of the first arm segment and the second arm segment is displaced at a variable angle from the central axis, wherein the variable angle has a range that spans from less than or equal to 1 degree to greater than or equal to 10 degrees.

In some additional, alternative, or selectively cumulative embodiments, the bike carrier has a central axis positioned between the first leg segment and the second leg segment, wherein at least one of the first arm segment and the second arm segment is displaced at a variable angle from the central axis, wherein the variable angle has a range that spans from less than or equal to 1 degree to greater than or equal to 15 degrees.

In some additional, alternative, or selectively cumulative embodiments, the bike carrier has a central axis positioned between the first leg segment and the second leg segment, wherein at least one of the first arm segment and the second arm segment is displaced at a variable angle from the central axis, wherein the variable angle has a range that spans from about zero degrees to greater than or equal to 10 degrees.

In some additional, alternative, or selectively cumulative embodiments, the first arm segment supports one or more cradles configured to support a bicycle frame.

In some additional, alternative, or selectively cumulative embodiments, a bike-frame stabilizer is connected directly or indirectly to the first or second leg segments or the frame connector and configured to rest against vertical side frame pieces of the vehicle structure.

In some additional, alternative, or selectively cumulative embodiments, the bike-frame stabilizer comprises discrete first and second frame-stabilizer segments that are pivotally connected to the first or second leg segments or the frame connector.

In some additional, alternative, or selectively cumulative embodiments, the first frame-stabilizer segment forms a frame stabilizer angle that is greater than or equal to 40 degrees with the first leg segment when the first frame-stabilizer segment is in a deployed position.

In some additional, alternative, or selectively cumulative embodiments, the first frame-stabilizer segment forms a frame stabilizer angle that is less than or equal to 10 degrees with the first leg segment when the first frame-stabilizer segment is in a collapsed position.

In some additional, alternative, or selectively cumulative embodiments, the first and second frame-stabilizer segments are connected to the frame connector at respective positions that are external to the respective first and second leg segments.

Selectively cumulative embodiments are embodiments that include any combination of multiple embodiments that are not mutually exclusive.

Additional aspects and advantages will be apparent from the following detailed description of example embodiments, which proceeds with reference to the accompanying drawings.

BRIEF DESCRIPTION OF THE DRAWINGS

FIG. 1 is a side and front perspective view of a conventional push bumper that can be mounted on a vehicle structure.

FIG. 2 is a side and front perspective view of an embodiment of a bike carrier as mounted on a vehicle structure.

FIG. 2B is a side and front perspective view of another alternative embodiment of a bike carrier as mounted on a vehicle structure.

FIG. 2C is a sectional side view of a lower portion of an embodiment of the bike carrier shown in FIG. 2B, showing an embodiment of a frame connector that connects frame members of the bike carrier.

FIG. 9 is a side, front, and top perspective view of a lower portion of an embodiment of the bike carrier shown in FIG. 2, showing an embodiment of a frame connector that connects frame members of the bike carrier.

FIG. 10 is a side elevation view of a lower portion of an embodiment of the bike carrier shown in FIG. 2, showing an embodiment of a frame connector that connects frame members of the bike carrier.

FIG. 21 is front view of the embodiment of the bike carrier of FIG. 15 with its arm segments and frame-stabilizer segments in a collapsed configuration.

FIG. 22 is rear view of the embodiment of the bike carrier of FIG. 15 with its arm segments and frame-stabilizer segments in a collapsed open configuration.

FIG. 23 is top view of the embodiment of the bike carrier of FIG. 15 with its arm segments and frame-stabilizer segments in a collapsed open configuration.

DETAILED DESCRIPTION OF EMBODIMENTS

Figure 2A:
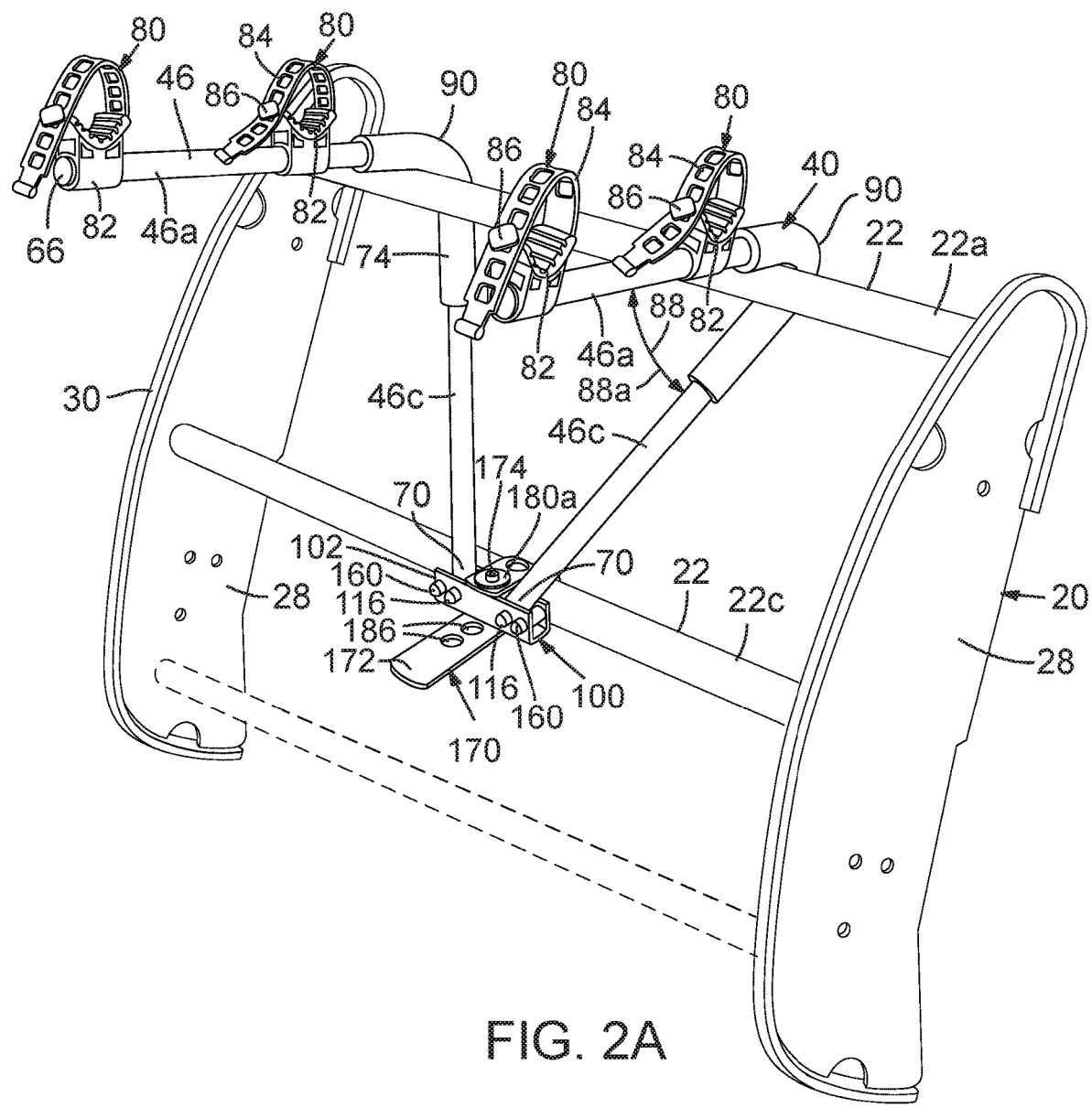
FIG. 2A is a side and front perspective view of an alternative embodiment of a bike carrier as mounted on a vehicle structure.

Example embodiments are described below with reference to the accompanying drawings. Unless otherwise expressly stated, the sizes, positions, etc., of components, features, elements, etc., as well as any distances therebetween, in the drawings are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," "comprising," "include," "includes," "including," "has," "have," and "having," when used in this document, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another and not to imply any relative order, placement, or ranking. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc., mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "forward," "rearward," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the drawings. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings. Additionally, the drawings may include non-essential elements that are included only for the sake of thoroughness. These non-essential elements may be removed entirely or left only in outline form if drawing changes are desired to create greater clarity.

The embodiments described herein are merely examples, set forth by way of illustration only and not limitation. Those skilled in the art will recognize in light of the teachings herein that there are alternatives, variations and equivalents to the example embodiments described herein and their component pans. For example, other embodiments are readily possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Described herein are bike carriers that can be quickly engaged and quickly disengaged directly or indirectly from a vehicle, such as from a vehicle structure or accessory such as a vehicle bumper. Vehicles include any type of powered road vehicle, such as an automobile, car, truck, recreational vehicle, sport utility vehicle, or law enforcement vehicle. One example of a vehicle structure is a push bumper, such a commonly mounted on a law enforcement vehicle. Vehicle structures can include, but are not limited to, other types of bumpers or automotive grills having a generally horizontal structural member.

FIG. 1 is a side and front perspective view of a conventional push bumper 20, which is an example of a vehicle structure, that can be mounted on the front of a vehicle (not shown), such as a law-enforcement vehicle. With reference to FIG. 1, a push bumper 20 typically includes multiple spaced-apart, generally horizontal structural members 22, such as an upper horizontal structural member 22a, a middle horizontal structural member 22b, and a lower horizontal structural member 22c. These structural members 22 may have a front side 24 that is farther away than a rear side (not shown) from a passenger compartment of the vehicle. One or more of these horizontal structural members 22 may be connected between side frame pieces 28, which may have front edges 30 that are configured to contact other vehicles during law enforcement operations such as pushing a vehicle. The structural members 22 may employ rails or struts and may have any suitable cross-sectional shapes, such as elliptical, circular, rectangular, or square.

Figure 3:
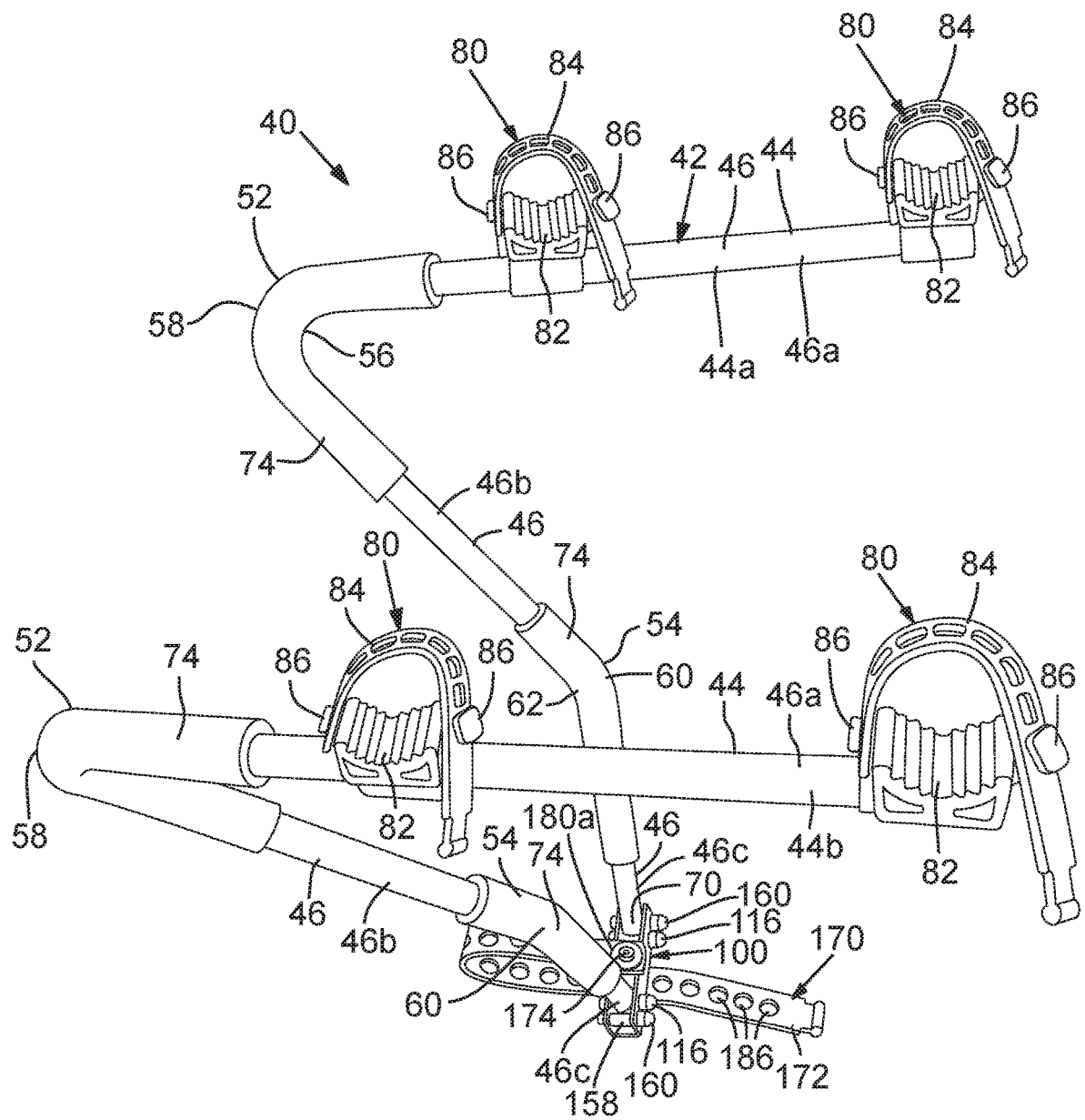
FIG. 3 is a side and top perspective view of an embodiment of the bike carrier shown in FIG. 2.
Figure 4:
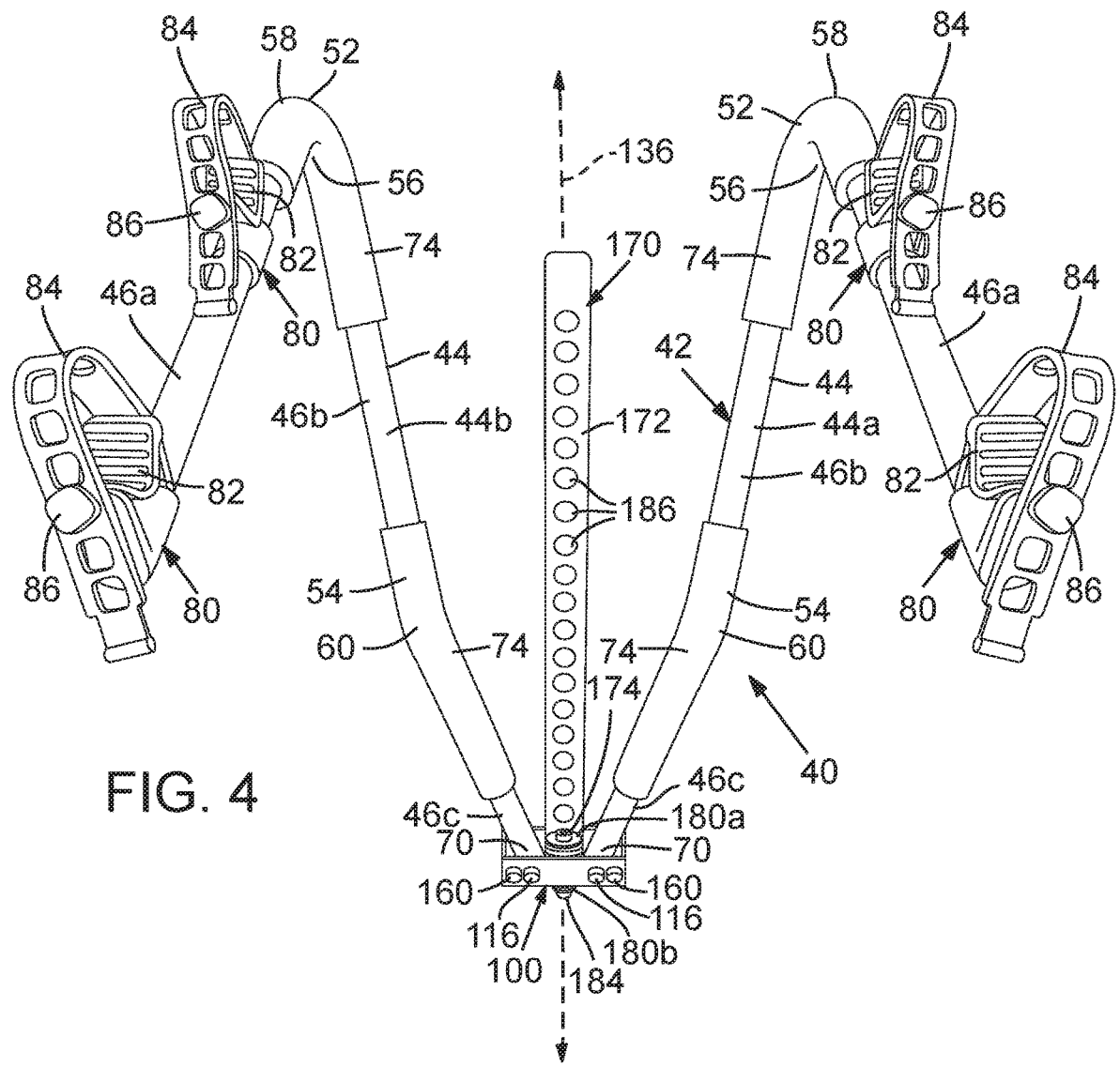
FIG. 4 is a front and top perspective view of an embodiment of the bike carrier shown in FIG. 2.
Figure 5:
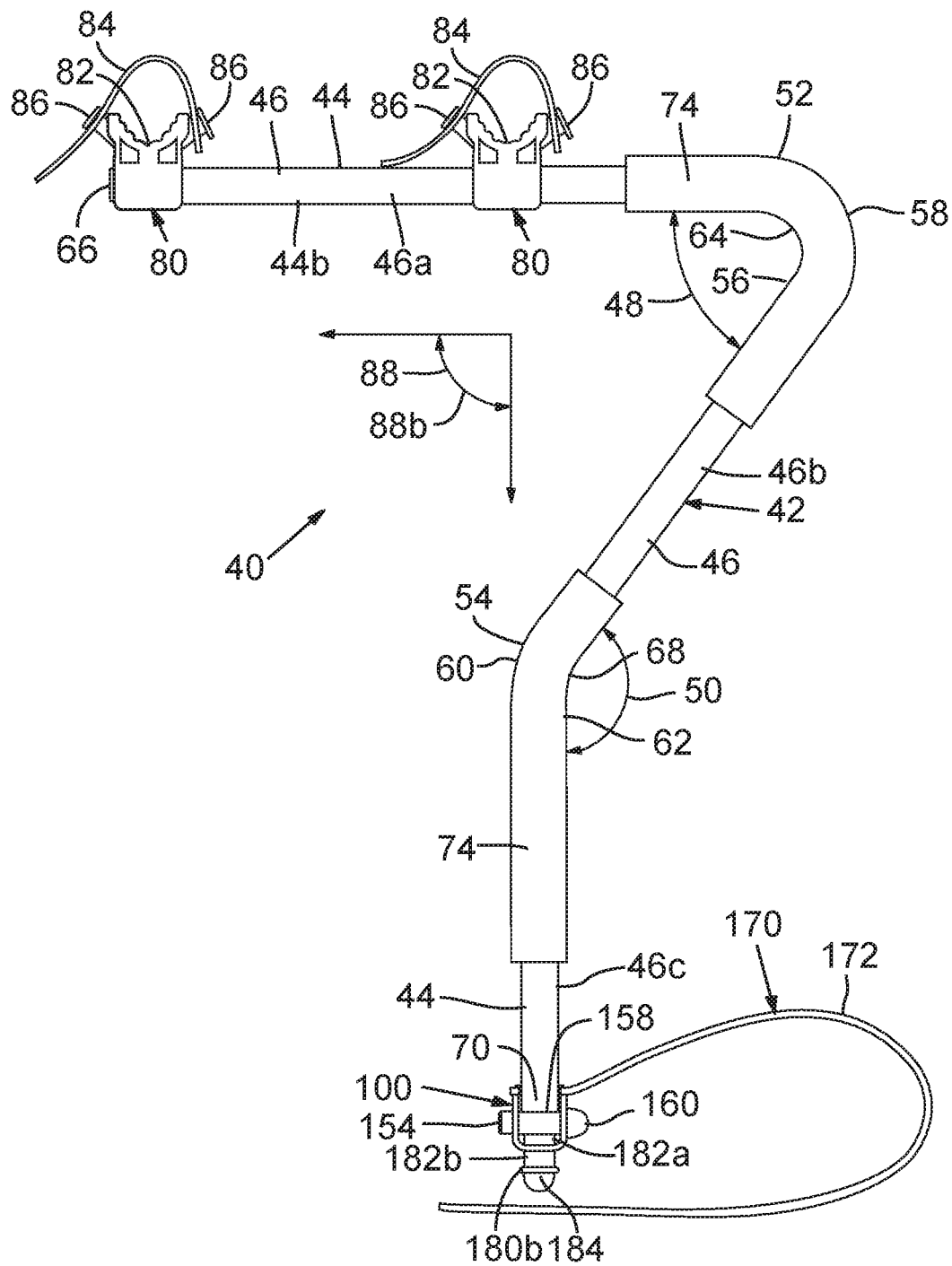
FIG. 5 is a side elevation view of an embodiment of the bike carrier shown in FIG. 2.
Figure 5A:
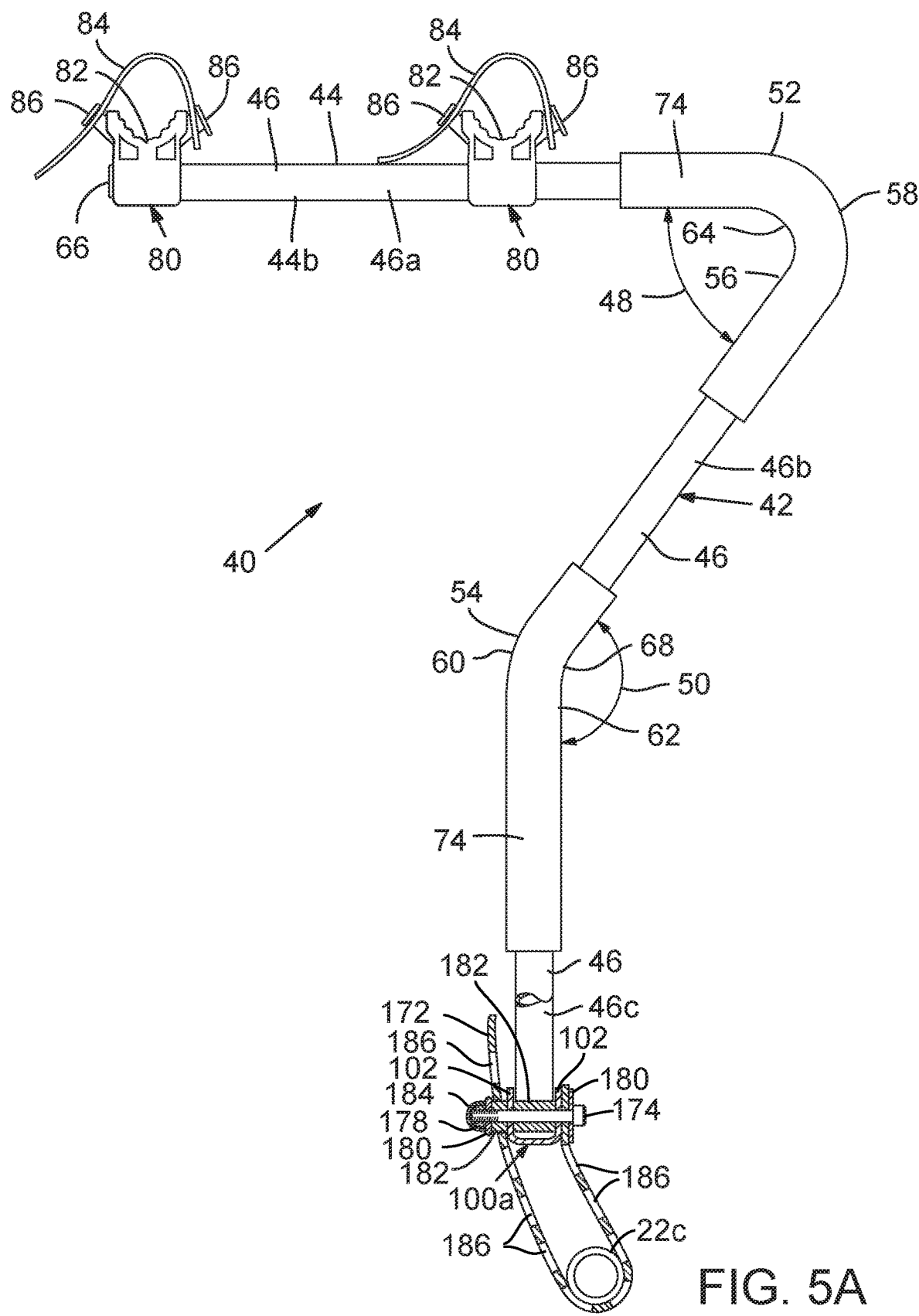
FIG. 5A is a side elevation view of an embodiment of the bike carrier shown in FIG. 2B.
Figure 6:
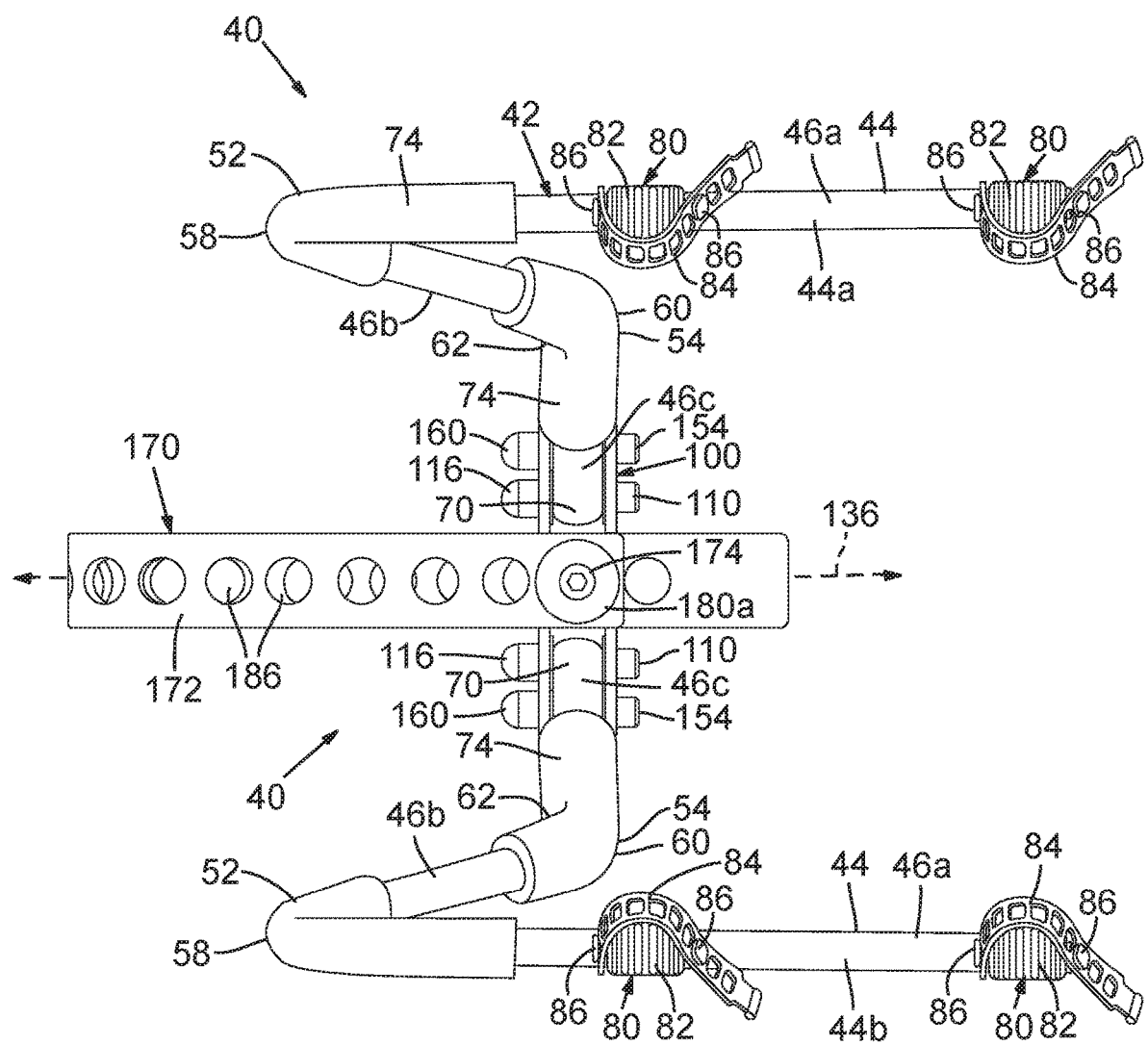
FIG. 6 is a top view of an embodiment of the bike carrier shown in FIG. 2.
Figure 7:
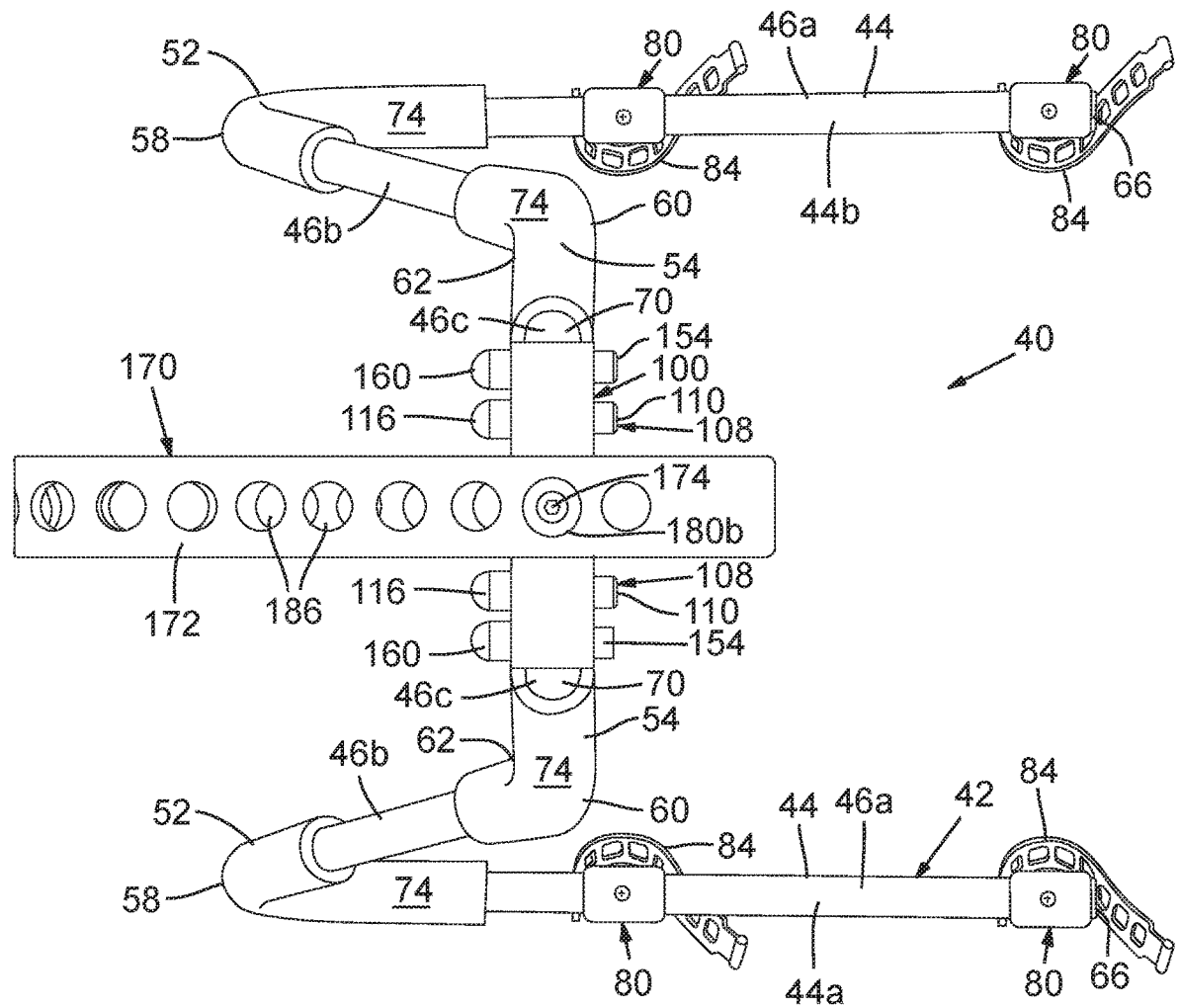
FIG. 7 is a bottom view of an embodiment of the bike carrier shown in FIG. 2.

FIG. 2 is a side and front perspective view of an embodiment of a bike carrier 40 as mounted on the push bumper 20; FIG. 2A is a side and front perspective view of an alternative embodiment of a bike carrier 40 as mounted on a variation of the push bumper 20; FIG. 2B is a side and front perspective view of another alternative embodiment of a bike carrier 40 as mounted on the push bumper 20; FIG. 2C is a sectional side view of a lower portion of an embodiment of the bike carrier 40 shown in FIG. 2B, showing an embodiment of a frame connector 100 that connects frame members 44 of the bike carrier 40; FIG. 3 is a side and top perspective view of an embodiment of the bike carrier 40; FIG. 4 is a front and top perspective view of an embodiment of the bike carrier 40; FIG. 5 is a side elevation view of an embodiment of the bike carrier 40; FIG. 5A is a side elevation view of an embodiment of the bike carrier 40 shown in FIG. 2B; FIG. 6 is a top view of an embodiment of the bike carrier 40; and FIG. 7 is a bottom view of an embodiment of the bike carrier 40.

With reference to FIGS. 1-7, an embodiment of the bike carrier 40 includes a carrier frame 42 that may include one or more frame members 44, such as a first frame member 44a and a second frame member 44b. Each frame member 44 may include one or more frame segments 46, including an upper frame segment, such as an arm frame segment 46a, and one or more lower frame segments, such as a central frame segment 46b and/or a leg frame segment 46c.

The arm segment 46a may be integrally formed as a single part, or it may be formed in distinct parts that are subsequently connected to allow its effective length to be adjusted such as to support additional bicycles. Another embodiment might utilize an extendable or telescoping arm segment 46a. Any suitable connection method can be employed, such as receiving holes and a push-lock pin mechanism.

The central segment 46b may be connected at a nonzero arm angle 48 to the arm segment 46b, and the central segment 46b may be connected at a leg angle 50 to the leg segment 46c. The arm angle 48 (FIG. 5) may be defined by an arm bend 52 between the central segment 46b and the arm segment 46a, and the leg angle 50 may be defined by a leg bend 54 between the central segment 46b and the leg segment 46a. Moreover, the arm angle 48 may be defined by the smallest of the two angles between the central segment 46b and the arm segment 46a, and the leg angle 50 may be defined by the smallest of the two angles between the central segment 46b and the leg segment 46c. (The largest (not shown) of the two angles would be from the top of the arm segment 46a to the rear of the central segment 46b.) The arm bend 52 may have a front side 56 and a rear side 58, and the leg bend 54 may have a front side 60 and a rear side 62. A distal end 66 of the arm segment 46a and a distal end 72 of the leg segment 46c may be provided with tube end plugs (not shown). The arm bend 52 and the leg bend 54 may conform to the cross-sectional dimension of the respective structural members 22.

The arm angle 48 or the arm bend 52 may have two functions. The arm angle 48 or the arm bend 52 may be configured to engage one of the horizontal structural members 22, such as the upper structural member 22a. The engagement may be direct or indirect contact between the arm bend 52 and the horizontal structural member 22, such as direct or indirect contact between a front side 56 of the arm bend 52 and the rear side or top side of the horizontal structural member 22. In some embodiments, the engagement with the horizontal structural member 22 may be contact within 2 inches of a vertex 64 of the arm angle 48 of the frame member 44. The engagement with the horizontal structural member 22 may be contact within 1 inch of the vertex 64 of the arm angle 48 of the frame member 44. The engagement with the horizontal structural member 22 may be contact within 0.5 inches of the vertex 64 of the arm angle 48 of the frame member 44. Engagement may include direct or indirect contact at the vertex 64.

The arm angle 48 or the arm bend 52 may also be configured to position the arm segment 46a so that it is generally horizontal with respect to the ground (or generally parallel to the ground). One will appreciate, however, that a distal end 66 of the arm segment 46a may be angled upward from the arm bend 52 with respect to the ground, or the distal end 66 of the arm segment 46a may be angled downward from the arm bend 52 with respect to the ground.

The arm angle 48 may depend on: the leg angle 50; whether the leg bend 54, the central segment 46b, and/or the leg segment 46c passes in front of or behind the horizontal structural member 22b; and whether a distal portion 70 of the leg segment 46c is connected in front of or behind the horizontal structural member 22c. The arm angle 48 may be smaller than or equal to 90 degrees, smaller than or equal to 60 degrees, smaller than or equal to 45 degrees, or smaller than or equal to 40 degrees. The arm angle 48 may be greater than or equal to 25 degrees, greater than or equal to 30 degrees, or greater than or equal to 35 degrees. One will appreciate however that the arm angle 48 may be greater than 90 degrees or smaller than 40 degrees.

The arm angle 48 may be fixed regardless of whether the arm segment 46a and the central segment 46b are formed as a single integrated unit or are distinctly manufactured and then attached to each other. Moreover, even when the arm angle 48 is fixed, the arm segment 46a and the central segment 46b may be distinctly manufactured to allow the effective length of one or more of the arm segment 46a and the central segment 46b to be adjusted. For example, the arm segment 46a may slide into the central segment 46b (or the central segment 46b may slide into the arm segment 46a) so that the effective lengths permit the arm bend 52 to rest more closely against the vertex 64 of the arm bend 58. Any suitable connection method can be employed. For example, a push-lock pin in one of the arm segment 46a and the central segment 46b may engage one of several receiving holes on the other of the arm segment 46a and the central segment 46b.

Alternatively, the arm angle may be adjustable. For example, the arm segment 46a and the central segment 46b may be pivotally connected, such as by a locking hinge mechanism that can be locked in one or more variable or pre-selected arm angles 48. One will appreciate that any known movable connection mechanism can be employed. Moreover, the arm angle 48 may be completely collapsible, allowing the arm segment 46a and the central segment 46b to be nearly adjacent and nearly parallel to each other. For example, the arm angle 48 may be collapsible to less than or equal to 20 degrees, less than or equal to 15 degrees, less than or equal to 10 degrees, or less than or equal to 5 degrees.

The leg angle 50 or the leg bend 54 may have two functions. The leg angle 50 or the leg bend 54 may be configured to engage one of the horizontal structural members 22, such as the middle structural member 22b. The engagement may be direct or indirect contact between the leg bend 54 and the horizontal structural member 22, such as direct or indirect contact between a rear side 62 of the leg bend 54 and the front side or top side of the horizontal structural member 22. In some embodiments, the engagement with the horizontal structural member 22 may be contact within 2 inches of a vertex 68 (FIG. 5) of the leg angle 50 of the frame member 44. The engagement with the horizontal structural member 22 may be contact within 1 inch of the vertex 68 of the leg angle 50 of the frame member 44. The engagement with the horizontal structural member 22 may constitute contact within 3 inches of the vertex 68 of the leg angle 50 of the frame member 44, may constitute contact within 2 inches of the vertex 68 of the leg angle 50 of the frame member 44, may constitute contact within 1 inch of the vertex 68 of the leg angle 50 of the frame member 44, or may constitute contact within 0.5 inches of the vertex 68 of the leg angle 50 of the frame member 44. In some embodiments, the engagement with the horizontal structural member 22 may constitute contact within 0.5 to 3 inches of the vertex 68 of the leg angle 50 of the frame member 44. One will appreciate however that the engagement with the horizontal structural member 22 may constitute contact at greater than 3 inches of the vertex 68 of the leg angle 50 of the frame member 44 or within less than 0.5 inches of the vertex 68. Engagement may include direct or indirect contact at the vertex 68.

The leg angle 50 or the leg bend 54 may also be configured to position the leg segment 46c so that its distal portion 70 rests within a specified distance of a horizontal structural member 22, such as the lower structural member 22c. The distal portion 70 is shown in front of the lower structural member 22c in FIG. 2, but in some embodiments the distal portion 70 may rest behind the lower structural member 22c. In some embodiments, the distal portion 70 rests in direct or in indirect contact with the lower structural member 22c. In some embodiments, the distal portion 70 rests within a distance of 8 inches of the lower structural member 22c, within 6 inches of the lower structural member 22c, within 4 inches of the lower structural member 22c, within 2 inches the lower structural member 22c, or within 1 inch of the lower structural member 22c. In some embodiments, the distal portion 70 rests beyond a minimal a distance of 1 inch from the lower structural member 22c, beyond a minimal a distance of 2 inches from the lower structural member 22c, or beyond a minimal a distance of 3 inches from the lower structural member 22c.

The leg angle 50 may depend on: the arm angle 48; whether the leg bend 54, the central segment 46b, and/or the leg segment 46c passes in front of or behind the horizontal structural member 22b; a desired amount of tension between a quick-release mechanism 170 (described later in greater detail) and the structural member 22c; and whether a distal portion 70 of the leg segment 46c is connected in front of or behind the horizontal structural member 22c. The leg angle 50 may be smaller than or equal to 90 degrees, smaller than or equal to 160 degrees, smaller than or equal to 150 degrees, or smaller than or equal to 140 degrees. The leg angle 50 may be greater than or equal to 100 degrees, greater than or equal to 110 degrees, or greater than or equal to 120 degrees. One will appreciate however that the arm angle 48 may be greater than 140 degrees or smaller than 100 degrees. One will appreciate that the leg angle 50 may utilize the same or entirely different ranges if the frame member 22 is configured to pass behind the horizontal structural member 22b.

The leg angle 50 may be fixed regardless of whether the leg segment 46c and the central segment 46b are formed as a single integrated unit or are distinctly manufactured and then attached to each other. Moreover, even when the leg angle 50 is fixed, the leg segment 46c and the central segment 46b may be distinctly manufactured to allow the effective length of one or more of the leg segment 46c and the central segment 46b to be adjusted. For example, the leg segment 46c may slide into the central segment 46b (or the central segment 46b may slide into the leg segment 46c) so that the effective lengths permit the distal portion 70 of the leg segment 46c to rest a more desired position or distance from the lower structural member 22c. A desired distance may be within 10 inches, 8 inches, 6 inches, 4 inches, or 2 inches of the lower structural member 22c. Any suitable connection method can be employed. For example, a push-lock pin on one of the leg segment 46c and the central segment 46b may engage one of several receiving holes on the other of the leg segment 46c and the central segment 46b.

Alternatively, the leg angle 50 may be adjustable. For example, the leg segment 46c and the central segment 46b may be pivotally connected, such as by a locking hinge mechanism that can be locked in one or more variable or pre-selected leg angles 50. One will appreciate that any known movable connection mechanism can be employed. Moreover, the leg angle 50 may be completely collapsible, allowing the leg segment 46c and the central segment 46b to be nearly adjacent and nearly parallel to each other. For example, the leg angle 50 may be collapsible to less than or equal to 20 degrees, less than or equal to 15 degrees, less than or equal to 10 degrees, or less than or equal to 5 degrees.

In some embodiments, the leg angle 50 may be zero degrees. In other words, the leg segment 46c and the central segment 46b may be a straight segment. As noted previously, the leg segment 46c and the central segment 46b may be integrally formed as a single part, or they may be formed in distinct parts that are subsequently connected to allow the effective length of the combined leg segment 46c and the central segment 46b to be adjusted, such as to permit the distal portion 70 of the leg segment 46c to rest a more desired position or distance from the lower structural member 22c. Another embodiment might utilize an extendable or telescoping central segment 46c. Any suitable connection method can be employed, such as the previously mentioned receiving holes and the push-lock pin mechanism.

One will appreciate that the vehicle structures, such as a push bumpers 20, may not all have that same spacing pattern between the different structural members 22. For example, the upper structural member 22a may be closer or farther from the middle structural member 22b. To accommodate such potential difference between vehicle structures, an extendable or telescoping central segment 46b could be employed so that the leg bend 54 rests within a desired distance of the middle structural member 22b. Alternatively, different models of the bike carrier 40 having different lengths of central segments 46 can be provided.

One will also appreciate that the lower horizontal structural member 22c may be closer or farther from the middle structural member 22b. For example, push bumpers utilized for Chevy Tahoe, Dodge Charger and Ford Police Interceptor Utility vehicles may have different distances between the upper structural member 22a and the lower structural member 22c than the push bumpers for other makes and models of law enforcement vehicles. Similarly, vehicle structures, such as bumpers, exterior roll cages, bumper guards, aftermarket grilles, grille guards, etc., on non-law enforcement vehicles may have varying distances between the upper structural member 22a and the lower structural member 22c. To accommodate such potential difference between vehicle structures, an extendable or telescoping leg segment 46c could be employed so that a frame connector 100 rests within a desired distance of the lower structural member 22c. Alternatively, different models of the bike carrier 40 having different lengths of lower segments 46c can be provided. FIG. 2B is a side and front perspective view of another alternative embodiment of a bike carrier 40 as mounted on the push bumper 20, wherein a quick release mechanism 170 (as later described in greater detail) is positioned or rests above the lower structural member 22c.

One will appreciate that the vehicle structure, such as a push bumper 20, may not include a third, lower horizontal structural member 22c. FIG. 2A is a side and front perspective view of an alternative embodiment of a bike carrier 40 as mounted on a vehicle structure without engaging the optional lower horizontal structural member 22c, shown in broken lines. For some such applications, the frame members 44 may include arm segments 46a that are directly or indirectly connected to the leg segments 46c without intervening central segments 46b. (An alternative way to conceive of such embodiments is that the frame members 44 may terminate at the central segments 46b, i.e., the carrier frame 40 may not include the leg segments 46c, and the leg bends 54 (not shown in FIG. 2A) may be an optional feature.) In these shorter embodiments, the frame connector 100 may be covered with a protective material, such as a glued-on foam piece, where the frame connector 100 might be expected to come in contact with a structural member 22.

With reference again to FIGS. 1-7, the leg segment 46c may be directly or indirectly connected at a nonzero frame angle 88, such as a frame angle 88a in FIG. 2A and a frame angle 88b in FIG. 5, to the arm segment 46b. In embodiments in which there is no intervening central segment 46b between the arm segment 46a and the leg segment 46c, the frame angle 88 may constitute the arm angle 48 or the arm angle may constitute the frame angle 88. In such embodiments, the frame angle 88 may be defined by a frame bend 90 between the arm segment 46a and the leg segment 46c. Moreover, the frame angle 88 may be defined by the smallest of the two angles between the arm segment 46a and the leg segment 46c.

The frame angle 88 or the frame bend 90 may have two functions. The frame angle 88 or the frame bend 90 may be configured to engage one of the horizontal structural members 22, such as the upper structural member 22a. The engagement may be direct or indirect contact between the frame bend 90 and the horizontal structural member 22. In some embodiments, the engagement with the horizontal structural member 22 may be contact within 2 inches of the vertex of the frame angle 88, within 1 inch of the vertex of the frame angle 88, within 0.5 inches of the vertex of the frame angle 88. Engagement may include direct or indirect contact at the vertex.

The frame angle 88 or the frame bend 90 may also be configured to position the arm segment 46a so that it is generally horizontal with respect to the ground (or generally parallel to the ground) or at some other desired orientation with respect to the ground. The frame angle 88 may depend on: the leg angle 50; whether the leg bend 54, the central segment 46b, and/or the leg segment 46c passes in front of or behind the horizontal structural member 22b; and whether a distal portion 70 of the leg segment 46c is connected in front of or behind the horizontal structural member 22c. The frame angle 88 may be smaller than or equal to 120 degrees, 100 degrees, 90 degrees, 60 degrees, 45 degrees, or 40 degrees. The frame angle 88 may be greater than or equal to 25 degrees, 30 degrees, or 35 degrees. One will appreciate that the frame angle 88 may be greater than 120 degrees or smaller than 40 degrees. One will also appreciate that the frame angle 88 may be significantly different between embodiments having a central segment 46b such as shown in FIG. 5 and those without a central segment 46b such as in shown in FIG. 2A.

With reference again to FIG. 2A, the frame angle 88 may be fixed regardless of whether the arm segment 46a and the leg segment 46c are formed as a single integrated unit or are distinctly manufactured and then attached to each other. Moreover, even when the frame angle 88 is fixed, the arm segment 46a and the leg segment 46c may be distinctly manufactured to allow the effective length of one or more of the arm segment 46a and the leg segment 46c to be adjusted. For example, the arm segment 46a may slide into the leg segment 46c (or the leg segment 46c may slide into the arm segment 46a) so that the effective lengths permit the frame bend 90 to rest more closely against its vertex. Any suitable connection method can be employed. For example, a push-lock pin in one of the arm segment 46a and the leg segment 46c may engage one of several receiving holes on the other of the arm segment 46a and the leg segment 46c.

Alternatively, the frame angle 88 may be adjustable. For example, the arm segment 46a and the leg segment 46c may be pivotally connected, such as by a locking hinge mechanism that can be locked in one or more variable or preselected frame angles 88. One will appreciate that any known movable connection mechanism can be employed. Moreover, the frame angle 88 may be completely collapsible, allowing the arm segment 46a and the leg segment 46c to be nearly adjacent and nearly parallel to each other. For example, the frame angle 88 may be collapsible to less than or equal to 20 degrees, less than or equal to 15 degrees, less than or equal to 10 degrees, or less than or equal to 5 degrees.

In general, the frame segments 46 in a frame member 44a may be substantially identical to their corresponding frame segments in frame member 44b. These identical characteristics may include one or more of length, shape, diameter, material, color, etc. Similarly, the respective arm angles 48 of frame members 44a and 44b may be substantially identical, and the respective leg angles 50 of frame members 44a and 44b may be substantially identical. In some embodiments, the frame members 44a and 44b may be substantially symmetrical to each other. In some embodiments, the bike carrier 40 is substantially bilaterally symmetrical. The substantially identical parts of frame members 44a and 44b can be useful to simplify manufacturing and reduce overall costs. Some embodiments that simplify construction and minimize costs employ unitary formation of each frame member 44, such that frame segments 46a, 46b, and 46c are formed together as a single unit. And, the frame members 44a and 44b are substantially identical.

However, the lengths of corresponding segments and/or the angles of corresponding bends may be different to accommodate asymmetrical vehicle structures, such as asymmetrical push bumpers 20. Some circumstances may warrant one frame member 44 to have adjustability without providing adjustability on the other frame member. Some circumstances may warrant different materials for the different sides or different materials for the different frame segments 46. In some embodiments, corresponding parts of the different frame members 44 may have different colors such as to facilitate instructions or assembly, especially if the frame members 44 are not the same. Alternatively, corresponding frame segments 46 may have the same color while different corresponding frame segments 46 may have a different color, which could also facilitate instructions or assembly. The colors may also be different for other reasons, such as for style or suitability for the particular materials involved, especially if different parts have different material compositions.

The frame segments 46 may be solid or hollow. They may have any suitable cross-sectional profile, including but not limited to rectangular, elliptical, square, circular, or oval. Additionally, they have any suitable cross-sectional dimensions, including but not limited to between 0.5 to 2 inches. The frame segments 46 will typically have substantially similar shapes and cross-sectional dimensions; however, the shapes and/or cross-sectional dimensions may be different. The frame segments 46 may be made from one or more suitable materials, such as a metal, plastic, polymer, or composite. Suitable materials include but are not limited to steel, aluminum, or titanium, or alloys thereof, polycarbonate, or carbon fiber. One will appreciate that one or more of the arm segment 46a, central segment 46b, or leg segment 46c may be formed in a molding or casting process.

Any areas of the frame members 44 that could conceivably come into contact with or rest against any of the structural members 22 may be covered with a protective cover 74. For example, the arm bends 52 and the leg bends 54 may be covered by a foam sleeve. However, other suitable protective covers 74 or protective materials can be employed, and the coverage may extend well beyond the actual bends.

The arm frame segments 46a may support one or more quick-release bike frame-securement mechanisms 80, such as cradles 82 or other equipment fasteners. The bike frame cradles 82 are typically adapted to slide around the cross-sectional perimeter of the arm frame segments 46a and are configured to cup a portion of a bike frame (not shown). One will appreciate that the cup or cradle portion of the quick-release bike frame-securement mechanisms 80 may be substantially parallel to the length of the arm frame segments 46a so that the bike frames can be mounted to be transverse or perpendicular to the arm frame segments 46a.

The bike frame cradles 82 may include a preconnected (at one position) quick-release connector 84 or may be configured to have multiple attachment features 86 to accommodate two ends of such quick-release connector 84. The quick-release connector 84 may be a flexible cradle strap with catch holes, such as a chain strap, configured to fit around a post or a knob. The quick-release connector 84 may employ a toolless-release mechanism that may be configured for a human of average dexterity to engage the quick-release connector 84 (such as to secure the quick-release connector 84 around a bike frame) without use of an auxiliary tool. And, the quick-release connector 84 may be configured for a human of average dexterity to disengage the quick-release connector 84 (such as to release quick-release connector 84 from around a bike frame) without use of an auxiliary tool. Quick-release bike frame-securement mechanisms 80 are well-known and are commercially available in many variations. Examples include but are not limited to the Yakima Y8890177, Hollywood Racks 1" cradle sets, and Super Crush Cradle and the Thule Hold Fast, T3 Cradle Body, and Stay Put Cradle.

The arm segments 46a in cooperation with other components of the bike frame members 44 may be configured to support at least two bicycles. In some embodiments, the arm segments 46a in cooperation with other components of the bike frame members 44 may be configured to support at least 150 pounds, at least 175 pounds, at least 200 pounds, at least 225 pounds, or at least 250 pounds. The materials of the arm segments 46a and/or other components of the bike frame members 44 can be adapted to accommodate much greater weights if desirable for other applications of the bike frame carrier 40, such as non-bicycle support. The bike carrier 40 can be adapted to support mopeds, scooters, motor bikes, kayaks, ladders, ballistic shields, contaminated/hazardous items, or anything useful to law enforcement activities, especially equipment that might be too large or inconvenient to store in the trunk or back cargo area of a vehicle. In many circumstances, such equipment might not be much wider than the vehicle. One will appreciate that the quick-release mechanisms 84 can be selected to accommodate the specific equipment being transported. A variety of these arm-supported quick-release mechanisms 84 are commercially available from Thule, Yakima, Hollywood Racks, and other companies.

Figure 8:
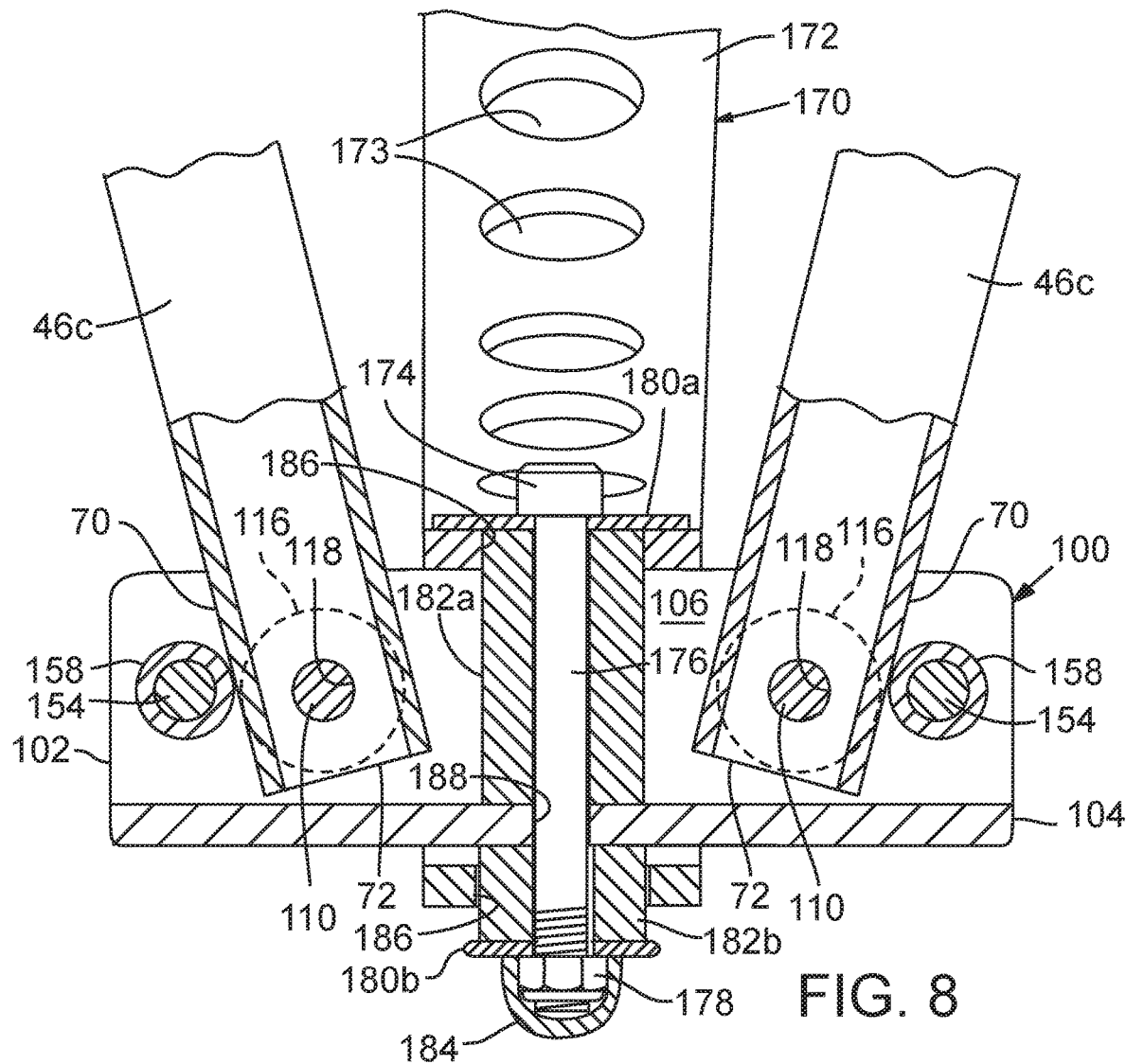
FIG. 8 is a frontal sectional view of a lower portion of an embodiment of the bike carrier shown in FIG. 2, showing an embodiment of a frame connector that connects frame members of the bike carrier.
Figure 11:
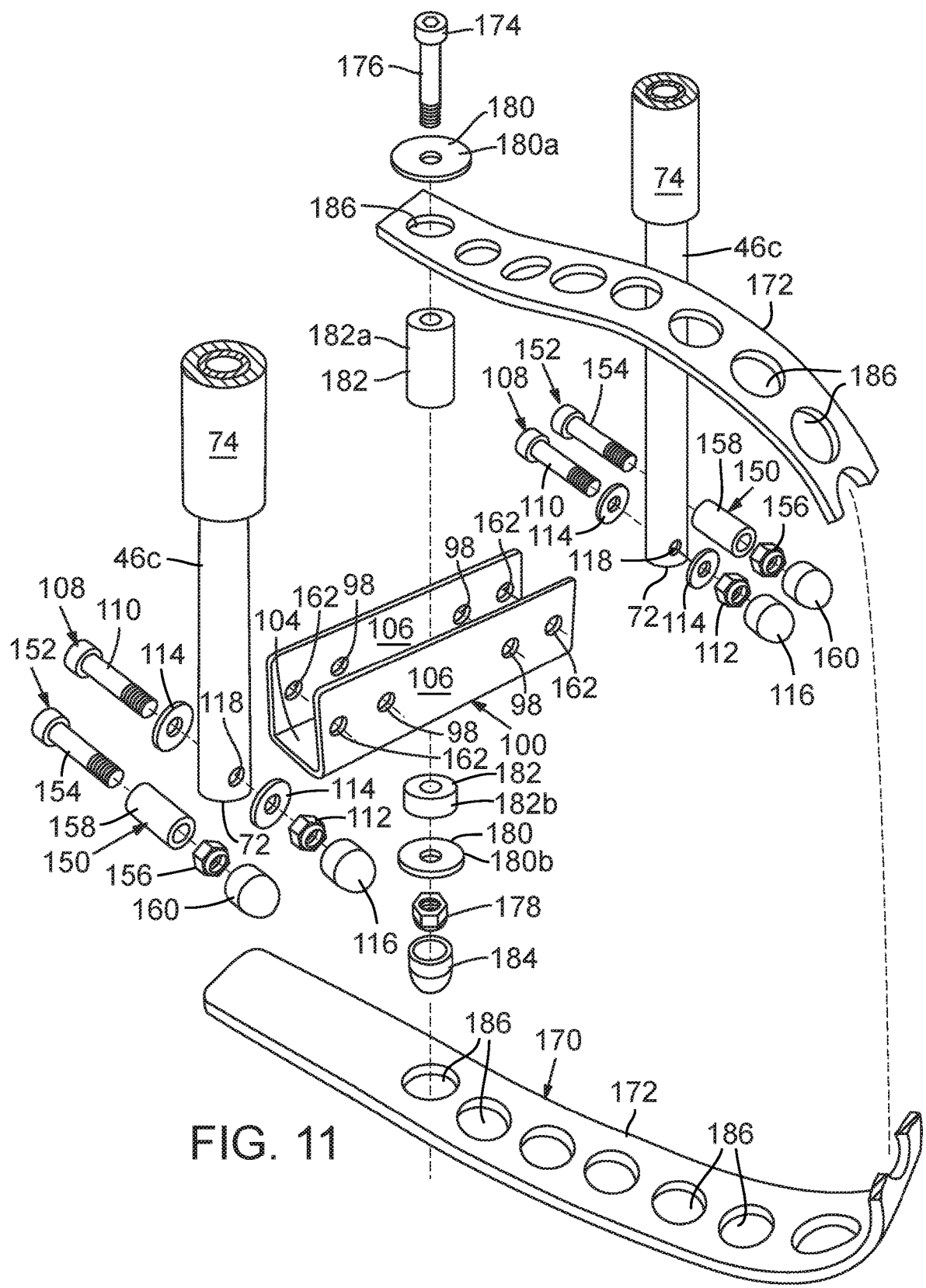
FIG. 11 is a side perspective exploded view of a lower portion of an embodiment of the bike carrier shown in FIG. 2, showing an embodiment of a frame connector that connects frame members of the bike carrier.
Figure 12:
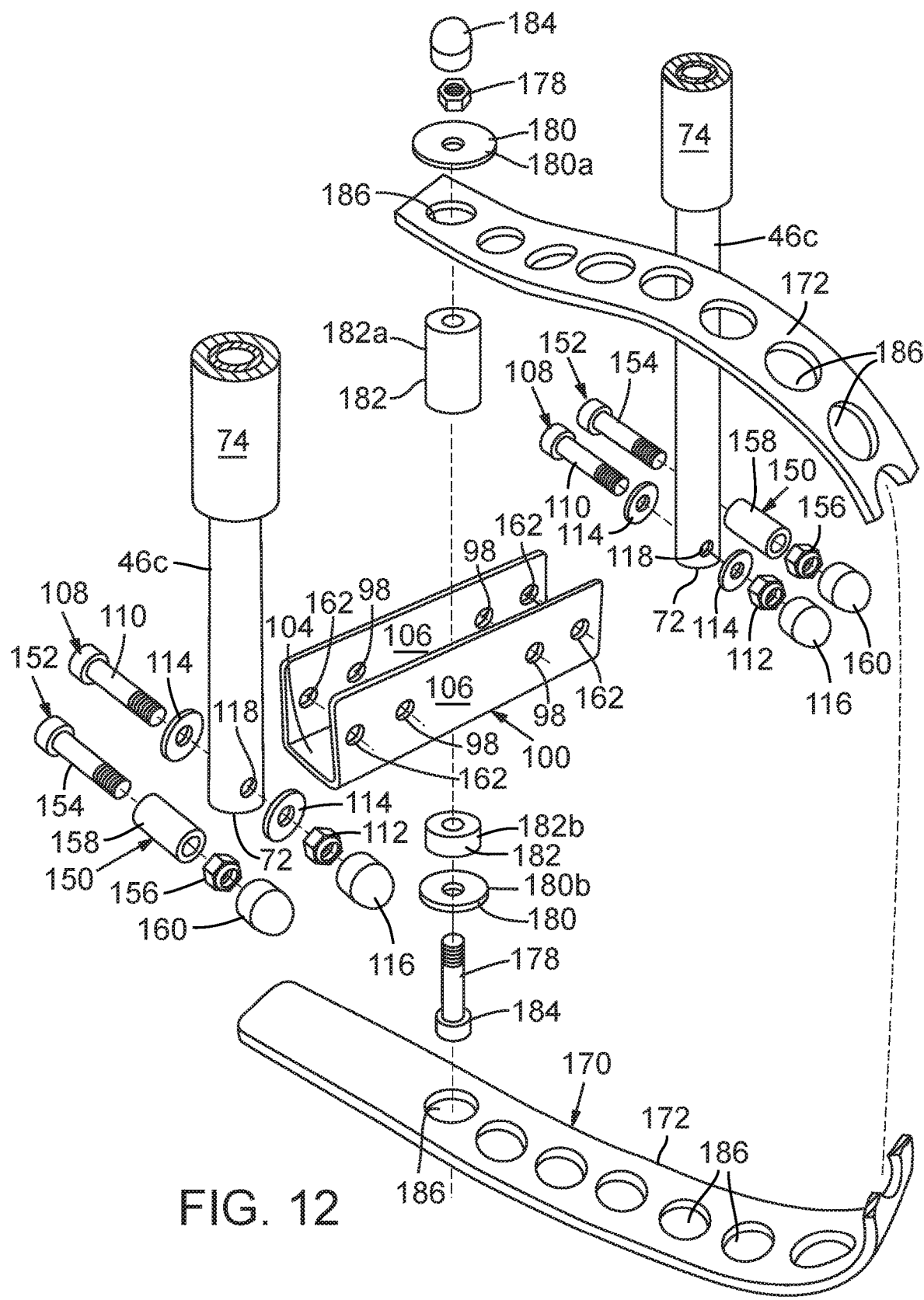
FIG. 12 is a side perspective exploded view of a lower portion of an alternative embodiment of the bike carrier shown in FIG. 2, showing an alternative embodiment of a frame connector that connects frame members of the bike carrier.
Figure 12A:
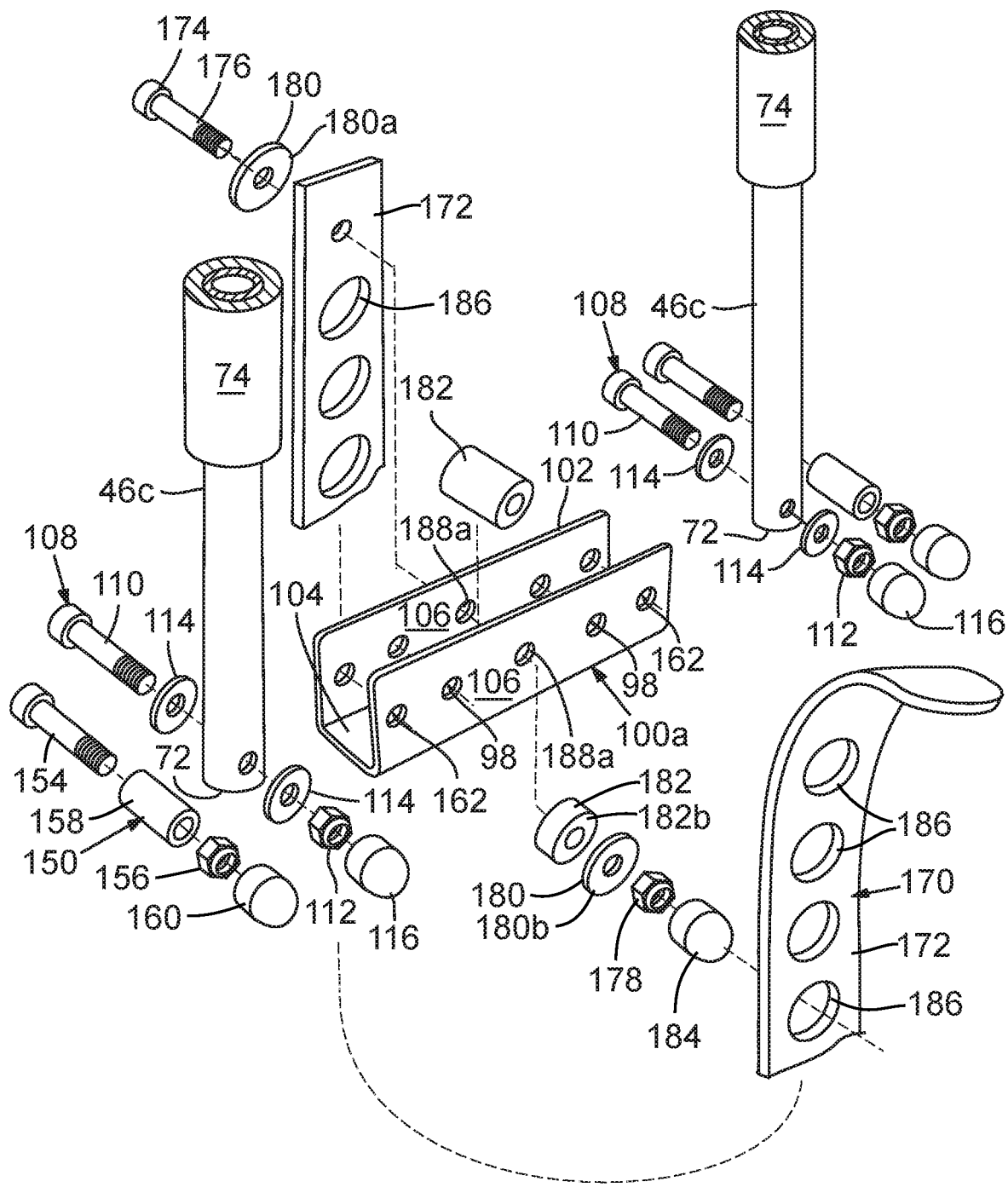
FIG. 12A is a side perspective exploded view of a lower portion of an alternative embodiment of the bike carrier shown in FIG. 2B, showing another alternative embodiment of a frame connector that connects frame members of the bike carrier.

FIG. 8 is a frontal sectional view of a lower portion of an embodiment of the bike carrier 40 that employs a frame connector 100 that facilitates connection of frame members 44; FIG. 9 is a side, front, and top perspective view of a lower portion of the bike carrier 40 that shows an embodiment of the frame connector 100; FIG. 10 is a side elevation view of a lower portion of an embodiment of the bike carrier 40 that shows the frame connector 100; FIG. 11 is a side perspective exploded view of a lower portion of the bike carrier 40 that shows the frame connector 100; FIG. 12 is a side perspective exploded view of a lower portion of an alternative embodiment of the bike carrier 40 that shows an alternative embodiment of the frame connector 100; and FIG. 12A is a side perspective exploded view of a lower portion of an alternative embodiment of the bike carrier 40 shown in FIG. 2B, showing another alternative embodiment of a frame connector 100 that connects frame members 44 of the bike carrier 40.

With reference to FIGS. 2B, 2C, and 8-12A, a frame connector 100 may be configured and positioned to connect directly or indirectly to either or both of the frame members 44. For example, the frame connector 100 may include a U-shaped bracket 102 that provides a bottom plate 104 of sufficient distance between adjoining side walls 106 to accommodate the cross-sectional dimension of the leg segment 46c, particularly the distal ends 72 of the leg segment 46c. The bracket 102 may have one or more bracket holes 98 adapted to receive a component of a frame fastener 108.

In addition to the bracket 102, the frame connector 100 may employ frame fasteners 108, which may include one or more pairs of mated bolts 110 and nuts 112, one or more washers 114, and one or more nut or bolt caps 116. The frame fasteners 108 may be configured to connect to the frame member 44 by any suitable mechanism. In some embodiments, one of the frame segments 46, such as at the distal portion 70 of the leg segment 46c, may include one or more receiving slots or frame holes 118 (FIGS. 11 and 12) that is configured to receive a component of the frame fasteners 108, such as the bolts 110. A bolt 110 may be employed to pass through opposing frame holes 118 that may be aligned with opposing bracket holes 98.

One will appreciate that a multitude of different fastening mechanisms can alternatively be employed. For example, the frame member could employ opposing push-lock pins instead of the frame holes 118 that can be used to engage the bracket holes 98, or the bracket holes 98 could be replaced with push-lock pins that can be used to engage the frame holes 118. The frame fasteners 108 can be replaced by any conventionally known suitable fastening mechanism.

The frame fasteners 108 can be configured to immobilize the frame members 44 in a particular orientation with respect to each other or with respect to the frame connector 100; or, the frame fasteners 108 can be configured to allow movement of the frame members 44 with respect to each other or with respect to the frame connector 100. Moreover, the frame connector 100 may employ a variable frame connection mechanism or variable frame connection means to permit any intentional movement of the frame members 44 with respect to each other or with respect to the frame connector 100. In some embodiments, the frame fasteners 108 may be configured to provide pivotal movement of the frame members 44 with respect to each other or with respect to the frame connector 100. More particularly, the frame segments 46c may be pivotally connected to the frame connector 100.

Figure 14:
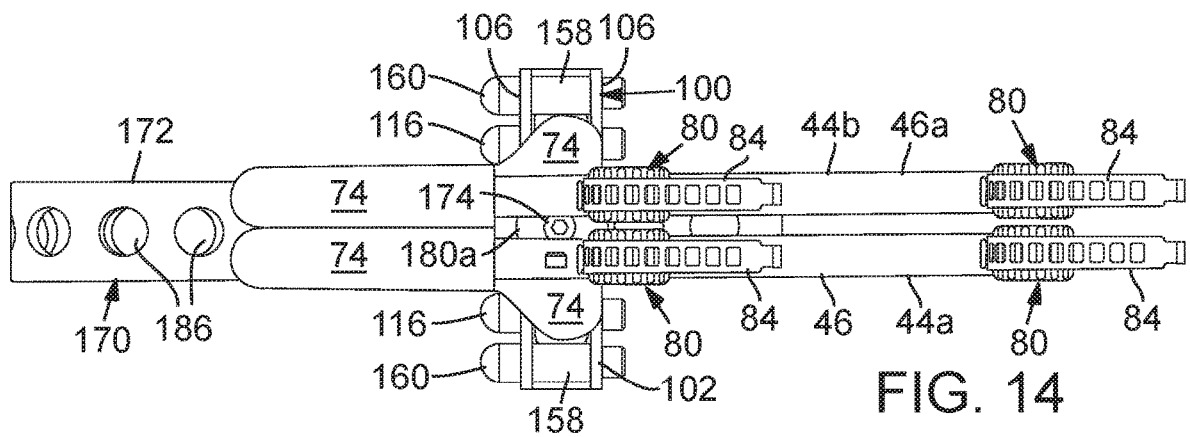
FIG. 14 is top view of an embodiment of the bike carrier with its arm segments in a parallel collapsed configuration.
Figure 13:
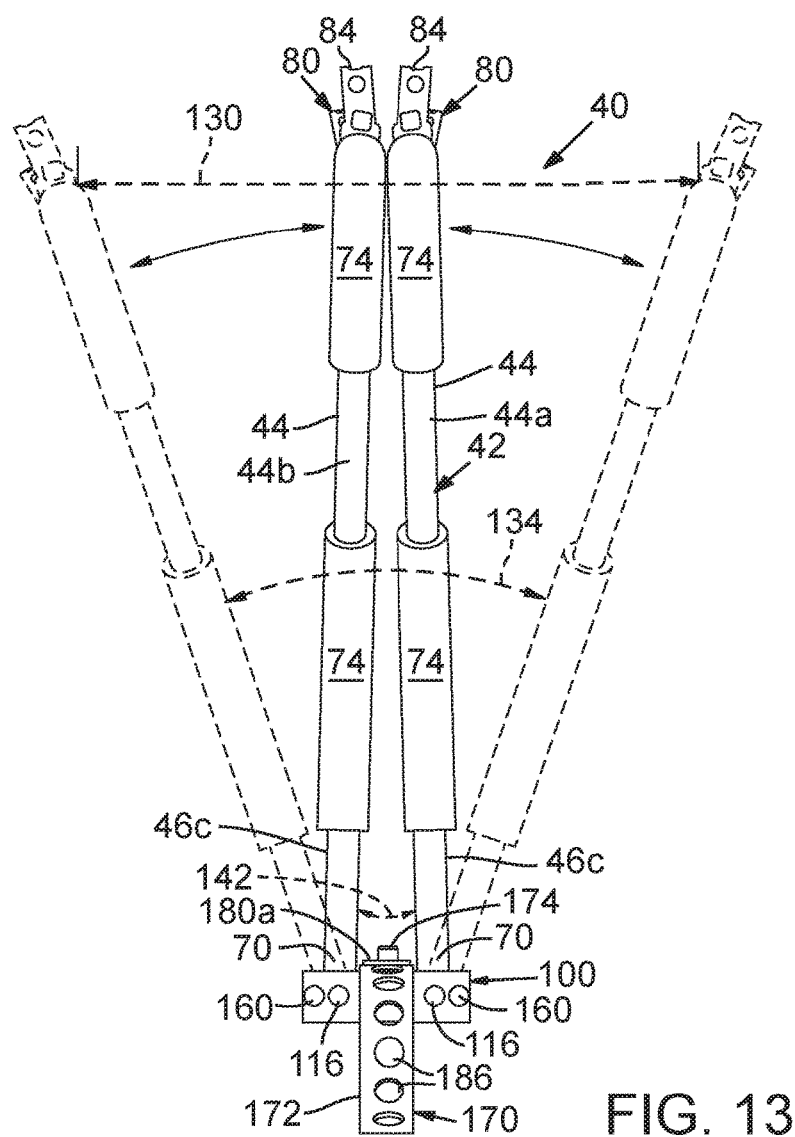
FIG. 13 is front view of an embodiment of the bike carrier with its arm segments in a collapsed configuration and with broken lines showing the arm segments in an open configuration.
Figure 15:
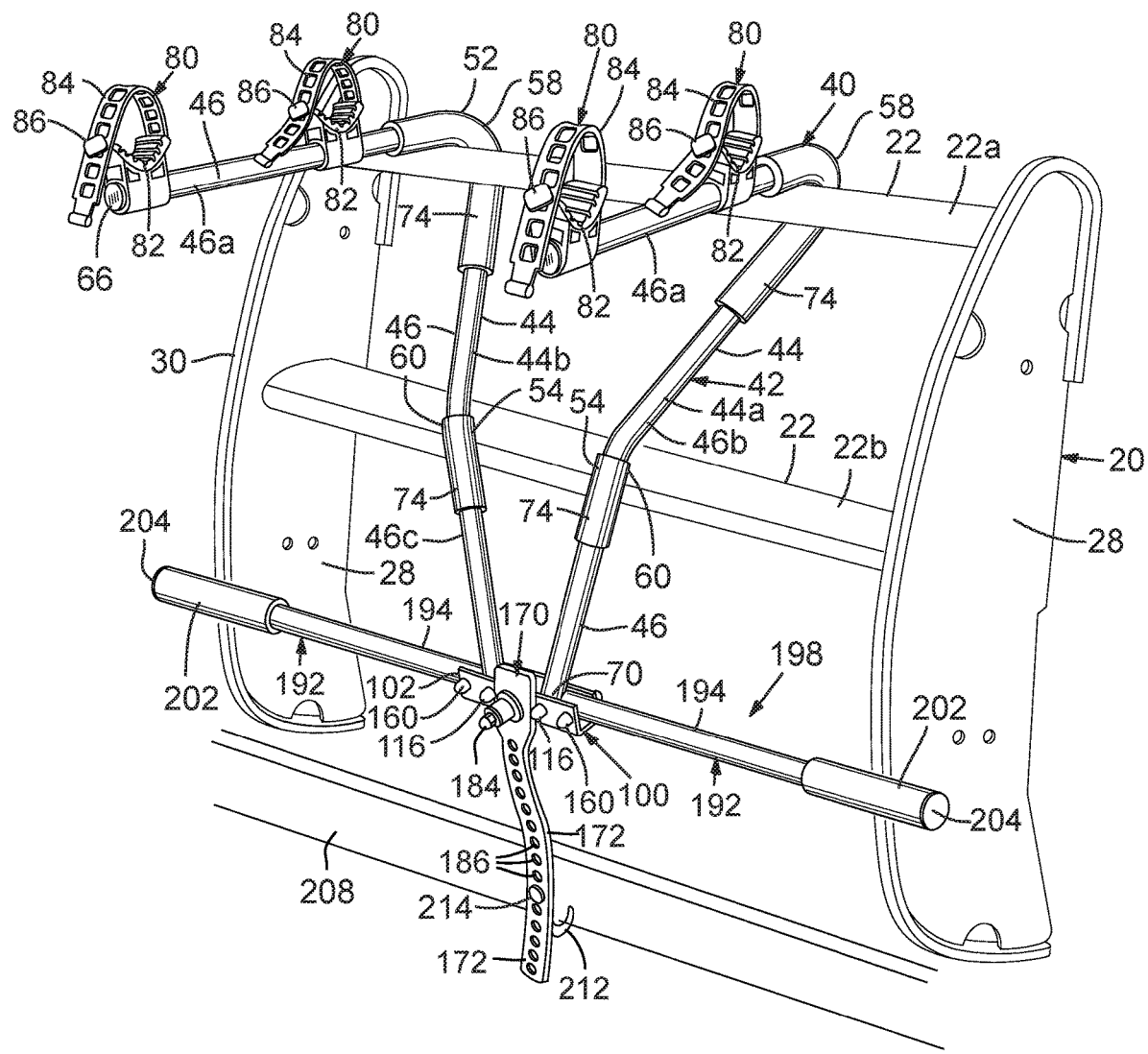
FIG. 15 is a side and front perspective view of another alternative embodiment of a bike carrier as mounted on a vehicle structure.
Figure 16:
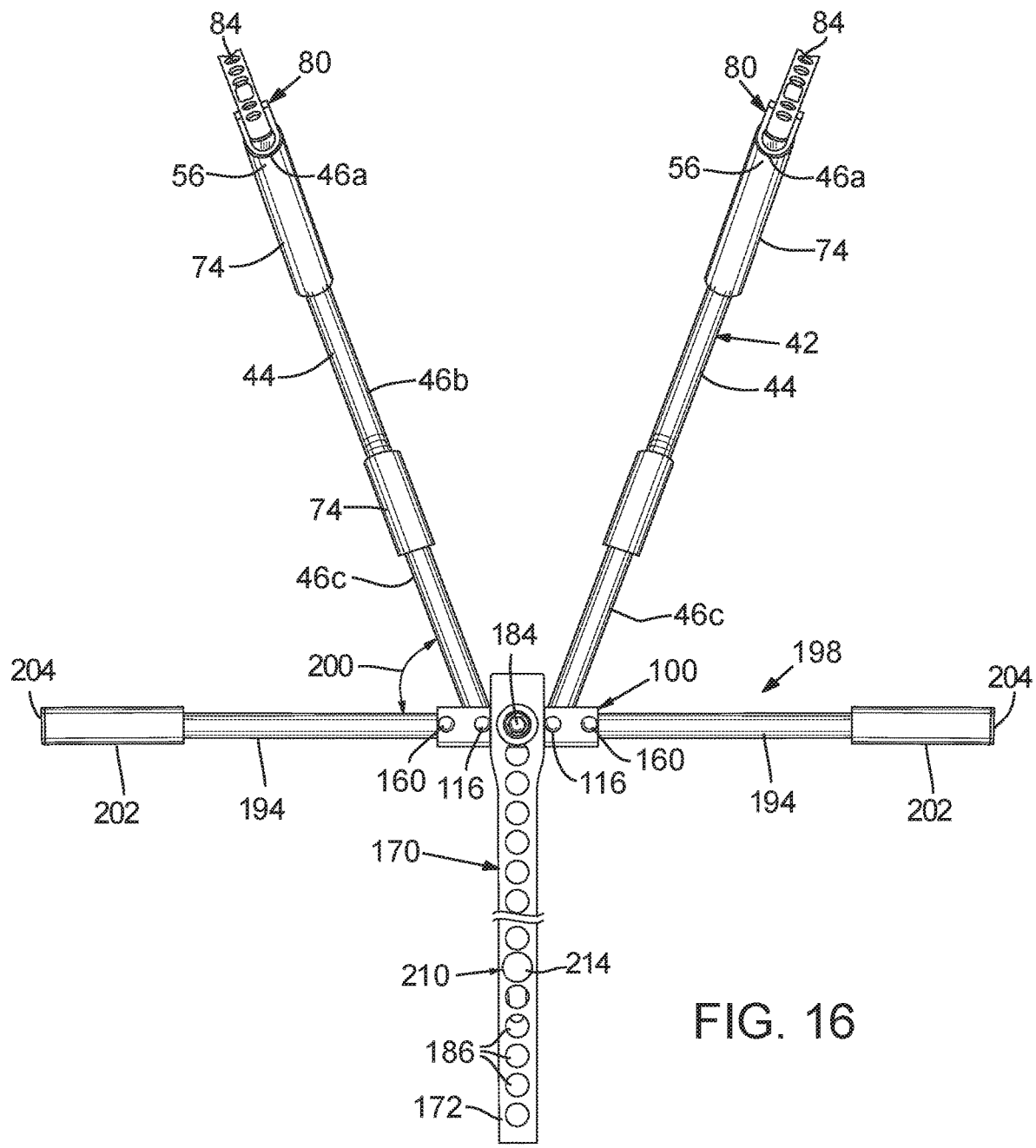
FIG. 16 is front view of the embodiment of the bike carrier of FIG. 15 with its arm segments and frame-stabilizer segments in an open configuration.
Figure 17:
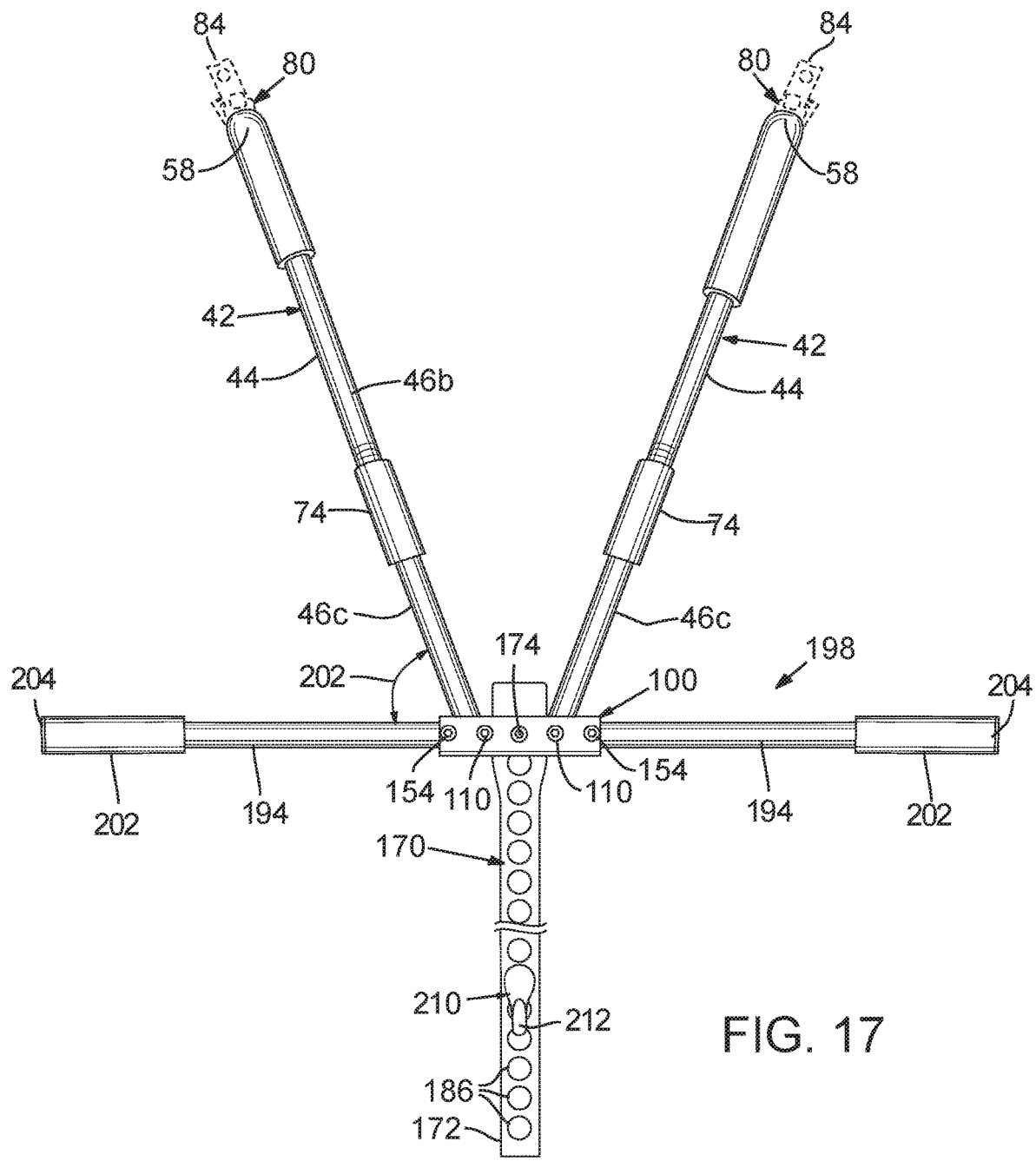
FIG. 17 is rear view of the embodiment of the bike carrier of FIG. 15 with its arm segments and frame-stabilizer segments in an open configuration.
Figure 18:
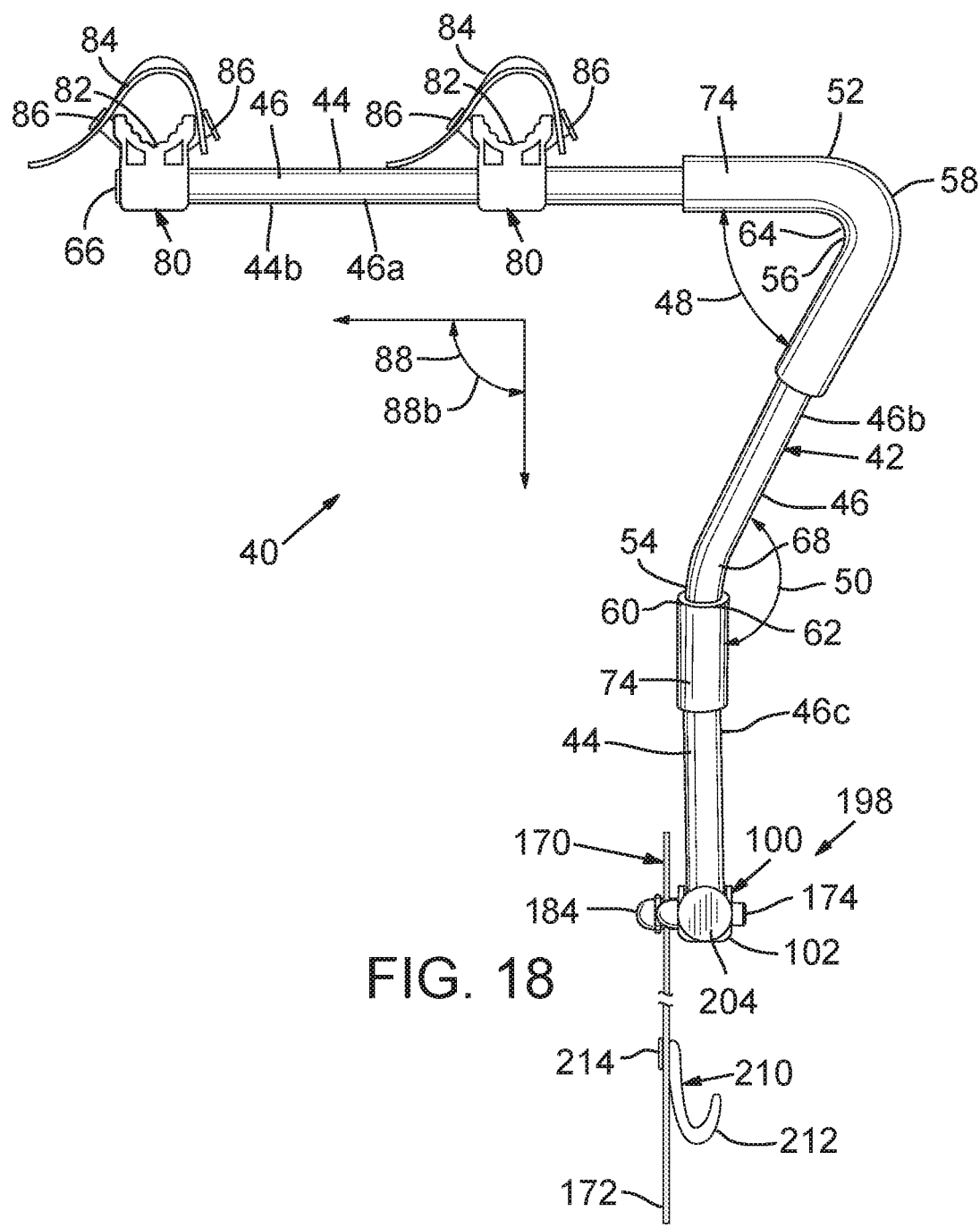
FIG. 18 is a side elevation view of the embodiment of the bike carrier shown in FIG. 15.
Figure 19:
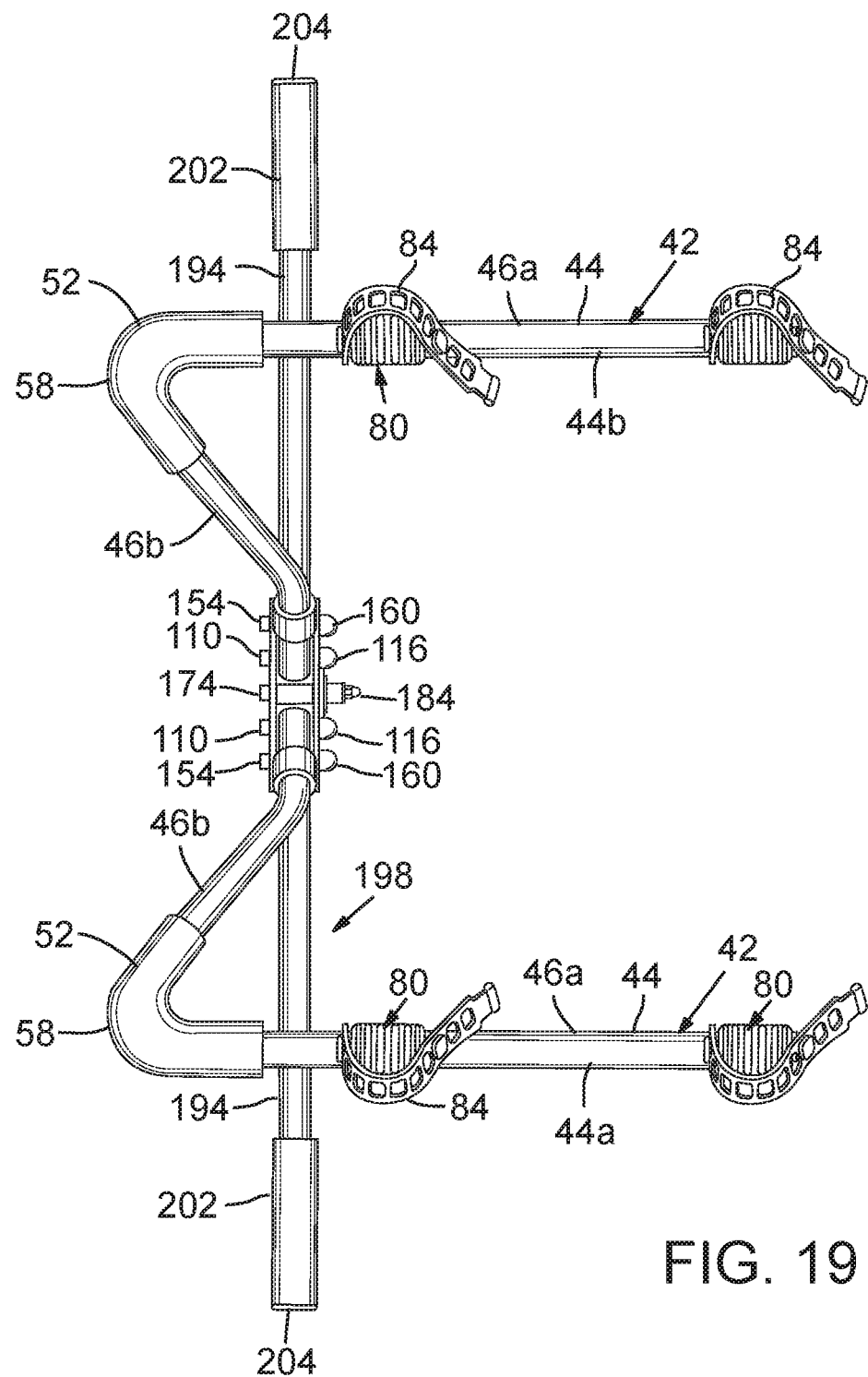
FIG. 19 is a top view of the embodiment of the bike carrier shown in FIG. 15.
Figure 20:
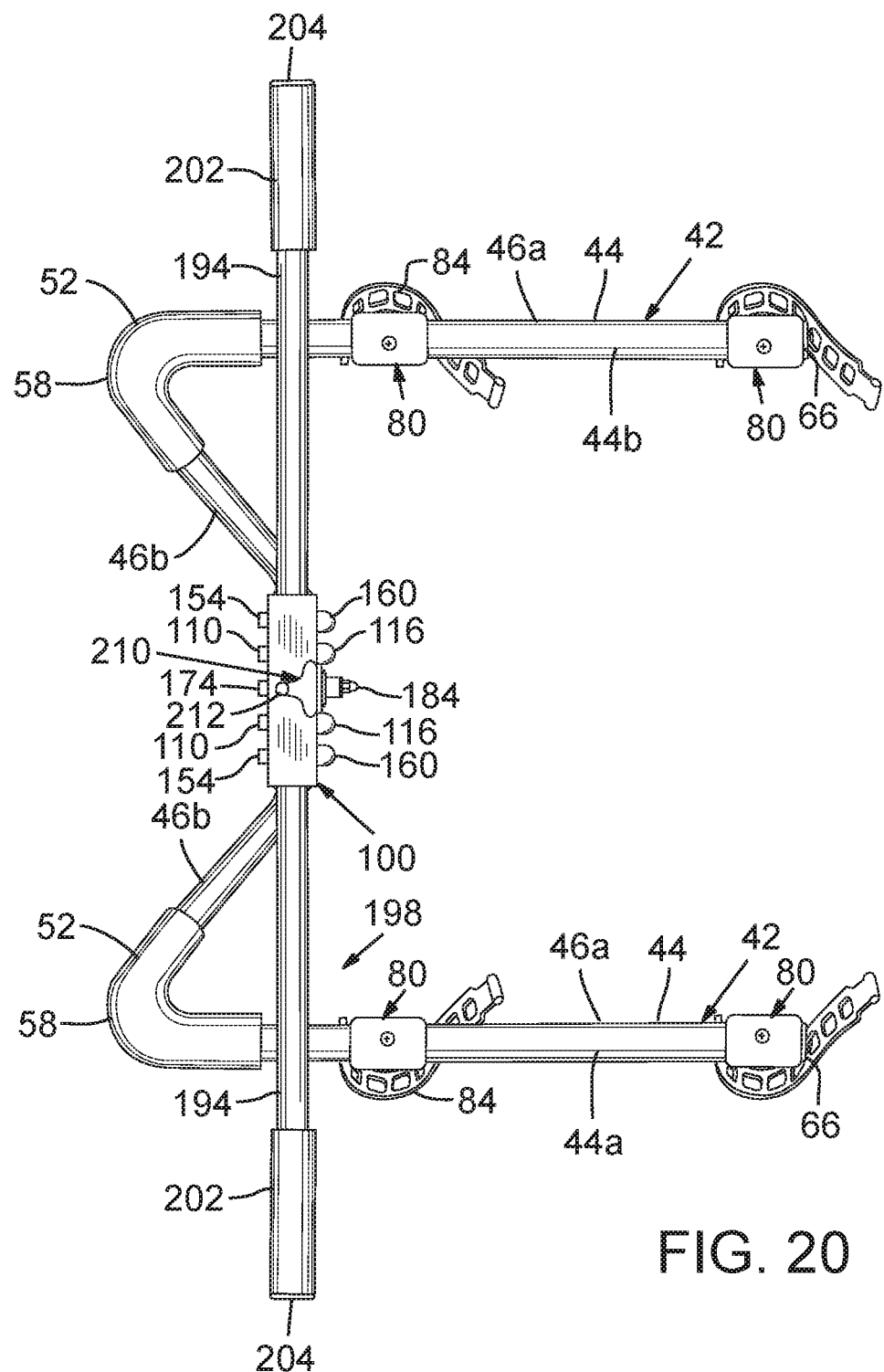
FIG. 20 is a bottom view of the embodiment of the bike carrier shown in FIG. 15.
Figure 24:
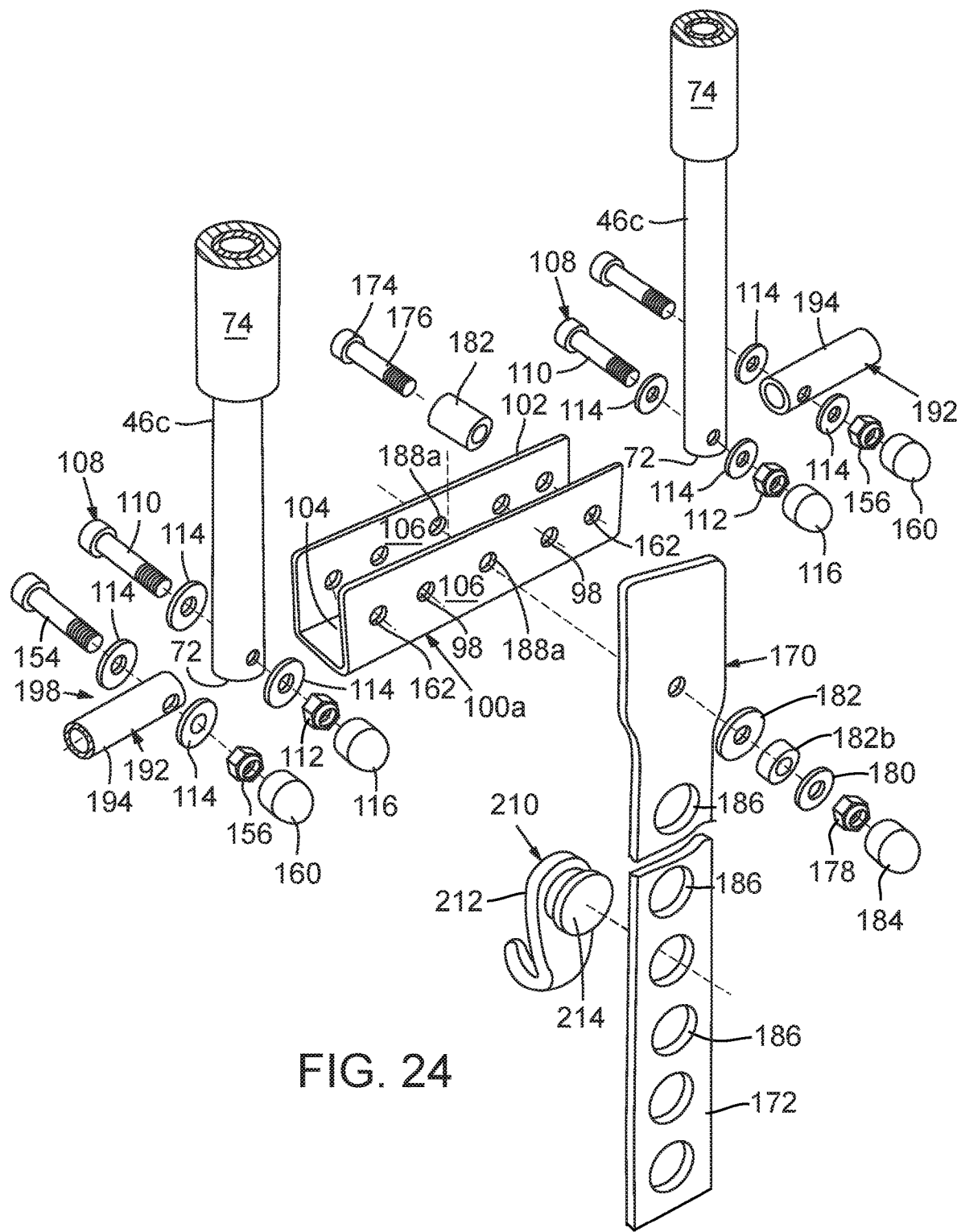
FIG. 24 is a side perspective exploded view of a lower portion of the embodiment of the bike carrier shown in FIG. 15, showing the frame-stabilizer segments as connected to the frame connector.

FIG. 13 is front view of an embodiment of the bike carrier 40 with its arm segments 46a in a collapsed configuration and with broken lines showing the arm segments 46a in an open configuration; and FIG. 14 is top view of an embodiment of the bike carrier 40 with its arm segments 46 in a parallel collapsed configuration. With reference to FIGS. 1-14, an adjustable arm distance 130 (or bike carrier width) between distal ends 66 of the arm segments 46a, or an adjustable carrier angle 134 between the arm segments 46a, may provide several advantages. For example, the arm distance 130 or the carrier angle 134 can determine the relative vertical distance between the upper structural member 22a and any given point on the central segment 46b, the leg segment 46c, and particularly the leg bend 54. Thus, by changing the carrier angle 134, the relative vertical distance of the leg bend 54 can be changed. This adjustability can permit the bike carrier 40 to be readily adapted to fit vehicle structures having structural members 22 that are differently spaced.

The frame connector 100 (variable frame connection mechanism or variable frame connection means) can be configured to provide multiple preset angles for the carrier angle 134, or the frame connector 100 can be configured to provide a substantially continuous range of available carrier angles 134. Additionally, the frame connector 100 can be configured to provide a stable carrier angle 134 in which the arm segments 46a retain their relative orientation to each other; or, the frame connector 100 can be configured to permit unhindered movement between a substantially continuous range of available carrier angles 134 such that the carrier angle 134 may automatically expand or contract to position the leg bends 54 at the position of the middle horizontal structural member 22 for example. In some embodiments, unhindered movement between a substantially continuous range of angles can be provided by a functionally pivotal frame connector 100, which can facilitate quick deployment of the bike carrier 40 onto a structure of the vehicle.

The adjustability can also permit the bike carrier 40 to support a variety of bike types, models, and sizes. In particular, the bike frame configurations and their frame component spacing can vary considerably. Simple contraction or expansion of the carrier angle 134 may permit the arm segments 46a to provide an arm distance 130 that can fit almost any bike frame configuration or bike frame-component spacing.

The variable frame connection mechanism or variable frame connection means can also permit the bike carrier 40 to be collapsible, such that the arm frame segments 46a are collapsible toward each other, to provide smaller volumetric dimensions for easy storage. The bike carrier 40 may have a central axis 136 or a central vertical plane positioned between the frame members 44, typically bisecting the arm distance 130 or the carrier angle 134 that separates the frame members 44. The arm segments 46a may also be described as being displaced at a frame member angle 140 from the central axis 136. The frame member angle 140 may have a range that spans from less than or equal to 1 degree to greater than or equal to 10 degrees or that spans from less than or equal to 1 degree to greater than or equal to 15 degrees. The frame member angle 140 may have a range that spans from about zero degrees to greater than or equal to 10 degrees.

FIG. 14 shows the carrier frame 42 in a collapsed or contracted configuration in which the frame members 44 exhibit a carrier angle 134 of about zero degrees and in which the frame members 44 are substantially parallel. The frame connector 100 may be configured to permit the distal ends 66 of the arm segments 46a to be closer to each other than the distance between the distal ends 70 of the leg segments 46c. Such configuration may exhibit an inverted angle 142 between the frame members 44. Such an inverted angle 142 is demonstrated in the collapsed configuration shown in FIG. 13, in which the arm distance 130 is effectively zero inches.

Carrier angle ranges may also be utilized. The carrier angle 134 may have a range that spans from less than or equal to 1 degree to greater than or equal to 20 degrees, that spans from less than or equal to 1 degree to greater than or equal to 30 degrees, that spans from less than or equal to 1 degree to greater than or equal to 40 degrees, or that spans from less than or equal to 1 degree to greater than or equal to 50 degrees. Alternatively, the carrier angle 134 might have a range that spans from about zero degrees to greater than or equal to 50 degrees.

In some embodiments, the bike carrier 40 may employ angle stop assemblies 150 that function to limit expansion of the frame member angles 140 and the carrier angle 134. The angle limit assemblies 150 may employ limit fasteners 152, which may include one or more pairs of mated bolts 154 and nuts 156, one or more sleeves 158, and one or more nut or bolt caps 160. The limit fasteners 152 may be configured to connect to the frame connector 100 by any suitable mechanism. In some embodiments, the frame connector 100 includes opposing limit slots or holes 162 that are adapted to receive a bolt 154 that fits through a sleeve positioned between the opposing holes 162. One will appreciate that a multitude of different angle-limiting mechanisms can alternatively be employed. The limit fasteners 152 can be used to predetermine the upper end of the range of the frame member angle 140 and the carrier angle 134. One will also appreciate that the ranges for the frame member angle 40 and the carrier angle 134 can be wider for embodiments having only two segments 46 (no central segments 46b or no leg segments 46c).

Some embodiments employ no limit fasteners 152 so that the arm segments 46a can almost lie in a plane, and the maximum arm distance 130 is about twice the length of an arm segment 46a plus any separation distance provided by the frame connector 100. However, the limit fasteners 152 can be employed to provide a maximum arm distance 130 of less than or equal to 36 inches (91.5 cm), 30 inches (76.2 cm), 24 inches (61 cm), or 20 (50.8 cm) inches. Alternatively, the limit fasteners 152 can be employed to provide a maximum arm distance 130 that is greater than or equal to 12 inches (30.4 cm), 16 inches (40.6 cm), 20 inches (50.8 cm), or 25 inches (63.5 cm).

In some embodiments, the arm segments 46a may be separated by a toolless variable distance that has a range that spans from less than or equal to three inches (7.5 cm) to greater than or equal to 18 inches (45.7 cm). In some embodiments, the arm segments 46a may be separated by a toolless variable distance that has a range that spans from zero inches (0 cm) to greater than or equal to 18 inches (45.7 cm). In some embodiments, the arm segments 46a may be separated by a toolless variable distance that has a range that spans from less than or equal to 1 inch (7.5 cm) to greater than or equal to 20 inches (51 cm). In some embodiments, the arm segments 46a may be separated by a toolless variable distance that has a range that spans from zero inches (0 cm) to greater than or equal to 18 inches (45.7 cm).

Under typical circumstances, a potential user of the bike carrier 40 will retrieve the bike carrier 40 from a storage area such a trunk, cargo area, or back seat of a vehicle (or from a non-vehicular storage area such as a garage). Generally, the bike carrier 40 will be stored in a collapsed configuration. The user can readily install the bike carrier 40 by holding it relatively parallel to the ground (with the arm segments 46a generally perpendicular to or transverse to the ground) and sliding up the arm segments 46a under and behind the upper structural member 22a. Once behind the structural member 22a, the bike carrier 40 (the arm segments 46a) can be rotated ninety degrees to allow the frame member 44 to drop down so that the leg segments 46 c rest against (or near) the structural member 22c. Then the arm segments 46a can be spread apart to the desired, variable width to accommodate the bike or bikes being transported. Finally, the bike carrier 40 can be secured to structural member 22b or 22c by engaging the quick-release mechanism 170.

The particular embodiment of the bike carrier and/or the particular type, style, or model of the vehicle structure may determine whether the central segment 46b slides in front of or behind a middle structural member 22b, and whether the frame connector 100 slides in front of or behind the lower structural member 22c (and comes to rest near the lower structural member 22c). (In the shorter embodiments of the bike carrier 40, the frame connector 100 may slide in front of or behind the middle structural member 22b and comes to rest near the middle structural member 22b.)

The bike carrier 40 may be configured for a human of average dexterity to place the carrier frame 42 on a vehicle structure (such as on a push bumper 20 of a law enforcement vehicle) without use of an auxiliary tool. And, the bike carrier 40 may be configured for a human of average dexterity to pull off the carrier frame from a vehicle structure without use of an auxiliary tool.

The user can then engage a quick-release mechanism 170 that may be positioned in proximity to the frame connector 100. The quick-release mechanism 170 may be configured for securing the bike carrier 40 to one of the generally horizontal structural members 22, such as the middle structural member 22b or the lower structural member 22c, depending on the particular type, style, or model of the vehicle structure.

In some embodiments, the quick-release mechanism 170 is directly or indirectly connected to the frame connector 100. The quick-release mechanism 170 may employ a securement strap 172 and a post 174 (or knob) that cooperate to secure the frame connector 100 of the bike carrier 40 to one of the structural members 22. The post 174 may utilize a mated bolt 176 and a nut 178 (such as a locknut), one or more washers 180, one or more spacers 182a and/or 182b (generically spacers 182), and one or more nut or bolt caps 184. The post 174 may be configured to connect to the frame connector 100 by any suitable mechanism. In some embodiments, the frame connector 100 includes a slot or hole 188 (FIG. 8) that may be adapted to receive the bolt 176.

One of the spacers 182a may be employed to occupy the vertical space between, and extend above, the walls 106 of the U-shaped bracket 102, and one of the spacers 182b may be employed to extend beyond the bottom of the U-shaped bracket 102. The spacers 182 may take the form of ferrules and may comprise the same or different material, which may be a relatively non-compressible material such as a metal. The spacers 182 may have a diameter or cross-sectional dimension configured to fit within slots or catch holes 186 of the securement strap 172 (or the catch holes 186 may be sized to receive the spacers 182). The spacers 182 can be sufficiently long enough to provide suitable distance (at least the thickness of the securement strap 172) to support attachment of a slot or catch hole 186 and holding of the of the securement strap 172 around the spacers 182. The securement strap 172 may be a flexible securement strap with catch holes 186, such as a chain strap, configured to fit around the spacers 182 of the post 170.

The washers 180 of the post 174 may have a diameter configured to be larger than the diameter of the spacers 182 to also help retain the catch holes 186 around the spacers 182, preventing inadvertent release of the securement strap 172. The diameter of the washers 180 can be coordinated with the dimensions of the catch holes 186 and the flexibility of the securement strap 172 to permit the catch holes 186 to extend beyond the washers 180 when the catch holes are stretched, but permit the washers 180 to retain the securement strap 172 when its catch holes are not stretched.

In some embodiments, the securement strap 172 may be pre-attached at one end. For example, one of the spacers 182 may be extended through one of the strap holes 186 and may secure the strap 172 with one or more supersized washers 180 that have diameters that are too great to allow the strap to escape the spacer 182. One advantage of having the strap 172 pre-attached at one end of the post 174 is that the strap 172 can always be found with the rest of the bike carrier 40 and is less likely to be lost or separated. Another advantage is that only the "free" end need be engaged with the post 174. Having to engage only a single free end, permits a user to take greater advantage of the quick-release mechanism 170.

The pre-attached end may be attached at the top side of the bracket 102 with the post 174 configured to engage the free end at the bottom side of the bracket 102, or pre-attached end may be attached at the bottom side of the bracket 102 with the post 174 configured to engage the free end at the top side of the bracket 102. However, both ends of the post 174 may be configured to receive and release the catch holes 186 of the strap 172 in a quick-release manner. Securing the quick-release mechanism 170 may entail placing the strap 172 around a structural member 22 of a vehicle structure and securing one of the catch holes 186 toward one end of the strap 172 around the top or bottom of the post 174 (or securing one of the catch holes toward one end of the strap 172, placing the strap 172 around a structural member 22 (such as on a push bumper 20 of a law enforcement vehicle), and securing one of the catch holes 186 toward the other end of the strap 172 around the other of the top or bottom of the post 174.

FIGS. 11 and 12 show different configurations for an embodiment of a post and catch quick-release mechanism 170. FIGS. 2B, 2C, 5A, and 12A show an alternative orientation for an embodiment of a quick release mechanism 170. In particular, an alternative frame connector 100a has bracket slots or holes 188a in the side walls 106 instead of in the bottom plate 104. The orientation of the holes 188a permits the post 174 to be oriented generally horizontally instead of generally vertically. An advantage of this orientation with the receiving cap 184 facing forward is that a user would be able to directly see the cap 184 when engaging or disengaging the strap 172.

One will appreciate that a multitude of different quick-release mechanisms 170 can alternatively be employed. For example, the quick-release mechanism 170 comprises mating hook and loop fasteners. The quick-release mechanism 170 may employ mated hook and loop (e.g., Velcro) fasteners. The quick-release mechanism 170 may employ a strap and a squeeze buckle. More particularly, the quick-release mechanism 170 may employ a strap and a side-release squeeze buckle. The quick-release mechanism 170 may employ a hole and spring pin.

The quick-release mechanism 170 may be configured for a human of average dexterity to engage the quick-release mechanism 170 (such as to secure the quick-release mechanism 170 to a vehicle structure) within one minute and for a human of average dexterity to disengage the quick-release mechanism 170 (such as to unsecure the quick-release mechanism 170 from a vehicle structure) within one minute (after knowledge of how to engage and disengage the quick-release mechanism 170 has been acquired). The quick-release mechanism 170 may be configured for a human of average dexterity to engage the quick-release mechanism 170 (such as to secure the quick-release mechanism 170 to a vehicle structure) within 45 seconds and for a human of average dexterity to disengage the quick-release mechanism 170 (such as to unsecure the quick-release mechanism 170 from a vehicle structure) within 45 seconds. More particularly, the quick-release mechanism 170 may be configured for a human of average dexterity to engage the quick-release mechanism 170 (such as to secure the quick-release mechanism 170 to a vehicle structure) within 30 seconds and for a human of average dexterity to disengage the quick-release mechanism 170 (such as to unsecure the quick-release mechanism 170 from a vehicle structure) within 30 seconds, may be configured for a human of average to dexterity engage the quick-release mechanism 170 (such as to secure the quick-release mechanism 170 to a vehicle structure) within 20 seconds and for a human of average dexterity to disengage the quick-release mechanism 170 (such as to unsecure the quick-release mechanism 170 from a vehicle structure) within 20 seconds, or may be configured for a human of average dexterity to engage the quick-release mechanism 170 (such as to secure the quick-release mechanism 170 to a vehicle structure) within 10 seconds and for a human of average dexterity to disengage the quick-release mechanism 170 (such as to unsecure the quick-release mechanism 170 from a vehicle structure) within 10 seconds.

The bike carrier 40 may be configured for a human of average dexterity to engage the bike carrier 40 (such as to place and secure the bike carrier 40 to a vehicle structure) within a minute and for a human of average dexterity to disengage the bike carrier 40 (such as to unsecure and remove the bike carrier 40 from a vehicle structure) within a minute. More particularly, the bike carrier 40 may be configured for a human of average dexterity to engage the bike carrier 40 (such as to place and secure the bike carrier 40 to a vehicle structure) within 45 seconds and for a human of average dexterity to disengage the bike carrier 40 (such as to unsecure and remove the bike carrier 40 from a vehicle structure) within 45 seconds, may be configured for a human of average dexterity to engage the bike carrier 40 (such as to place and secure the bike carrier 40 to a vehicle structure) within 30 seconds and for a human of average dexterity to disengage the bike carrier 40 (such as to unsecure and remove the bike carrier 40 from a vehicle structure) within 30 seconds, or may be configured for a human of average dexterity to engage the bike carrier 40 (such as to place and secure the bike carrier 40 to a vehicle structure) within 20 seconds and for a human of average dexterity to disengage the bike carrier 40 (such as to unsecure and remove the bike carrier 40 from a vehicle structure) within 20 seconds.

The bike carrier 40 may be configured for a human of average dexterity to engage the bike carrier 40 (such as to place and secure the bike carrier 40 to a vehicle structure), and to mount a bicycle within a minute and for a human of average dexterity to unmount a bicycle and disengage the bike carrier 40 (such as to unsecure and remove the bike carrier 40 from a vehicle structure) within a minute.

The quick-release mechanism 170 may employ a toolless-release mechanism or toolless-release means that may be configured for a human of average dexterity to engage the quick-release mechanism 170 (such as to secure the quick-release mechanism 170 to a vehicle structure) without use of an auxiliary tool. And, the quick-release mechanism 170 may be configured for a human of average dexterity to disengage the quick-release mechanism 170 (such as to release the quick-release mechanism 170 from a vehicle structure) without use of an auxiliary tool.

Some embodiments of the bike carrier 40 can be collapsed to achieve minimum dimensions for storage during nonuse, such as in the rear seat or trunk space of a vehicle. In some embodiments, the major dimension (or length) of the frame connector 100 may determine the minimum width of the collapsed bike carrier 40. This minimum width may be less than or equal to 10 inches, less than or equal to 8, inches, less than or equal to 6 inches, or less than or equal to 5 inches. The maximum height of a frame member 44 may also be less than or equal to 48 inches, 42 inches, 36 inches, or 32 inches. Embodiments without leg segments 46c may have even shorter maximum height dimensions. The maximum length of the arm segments 46a may also be less than or equal to 48 inches, 42 inches, 36 inches, 32 inches, 28 inches, or 24 inches.

Alternatively, the bike carrier 40 may not be collapsible, and the frames members 40 may be an integrally formed carrier frame 40 with or without a distinguishable foot segment (not shown) between the frame members 40.

Some embodiments of push bumpers 20 may not include a lower horizontal structural member 22c and may not be as tall as embodiments that do. For example, the Setina PB 400 push bumper for the Dodge Charger is different than the other PB bumpers that fit the Ford Police Interceptor Utility and the Chevrolet Tahoe PPV. In particular, the Dodge Charger push bumper is shorter and does not include a lower horizontal structural member 22c. These differences create different leverage and dimensional opportunities for bike rack variations.

FIGS. 15-24 show various views of another alternative embodiment of the bike carrier 40 that includes a bike-frame stabilizer 192 connected directly or indirectly to the first or second leg segments 46c or the frame connector 100 and configured to rest the side frame pieces 28 of a vehicle structure. With reference to FIGS. 15-24, similar components are labeled with reference numbers used in previous FIGS. 1-14, and these components may have similar attributes and allow for similar modifications and variations.

The bike carrier 40 may be shorter than the bike frame carrier shown in FIG. 2, so the bike-frame stabilizer 192 may provide a stable way to mount the bike carrier 40 on a shorter push bumper 20, for example, by effectively providing the push bumper 20 with added length as "leverage" for mounting the bike carrier 40 in a way that counteracts the leverage of the cantilevered arm segments 46a that support the bicycles. In other words, the bike-frame stabilizer 192 may effectively provide a substitute for the horizontal structural member 22c where one is lacking on push bumper 20 for the Dodge Charger.

The bike-frame stabilizer 192 may include discrete first and second frame-stabilizer segments 194 that are each connected directly or indirectly to a different one of the first or second leg segments 46c or to the frame connector 100. The bike-frame stabilizer 192 may be made from the same material(s) as the leg segments 46c or may be made from different material(s), and the cross-sectional or shape or diameter may be the same or different. The bike-frame stabilizer 192 may have a length that is greater than or equal to the distance between the side frame pieces 28 of the vehicle structure, and the frame-stabilizer segments 194 may have lengths that are greater than half the distance between the side frame pieces 28.

The frame-stabilizer segments 194 may have proximal ends and distal ends, wherein the proximal ends are closer to the frame connector 100 than are the distal ends. The frame-stabilizer segments 194 toward their distal ends may be covered by a protective material 202, such as a foam sleeve, to cushion the vehicle structure when the frame-stabilizer segments 194 rest against the side frame pieces 28. The distal ends themselves may also be covered, such as by plastic plugs 204.

A stabilizer connection mechanism for connecting the frame-stabilizer segments 194 may permit relative movement between the first and second frame-stabilizer segments 194 and the respective first and second leg segments 46c. For example, the stabilizer connection mechanism may utilize a pivotal connection mechanism such that the first and second frame-stabilizer segments 194 are pivotally connected to the respective first or second leg segments or the frame connector. In some embodiments, the proximal ends of the first and second frame-stabilizer segments 194 may be connected to the frame connector 100 at respective positions that are external to the respective first and second leg segments 46c. For example, a bolt 154 and a nut 156 may secure each frame-stabilizer segment 194 to the frame connector 100 with optional washers 114 placed between the frame-stabilizer segment 194 and the frame connector 100.

The relative movement between the first and second frame-stabilizer segments 194 and the respective first and second leg segments 46c allows the frame-stabilizer segments 194 to assume a collapsed position 196, such as depicted in FIGS. 21-23. The relative movement between the frame-stabilizer segments 194 and the respective leg segments 46c allows the frame-stabilizer segments 194 to assume an open or deployed position, such as a fully deployed position 198, which is depicted in FIGS. 15-20. From the collapsed position 196 to the fully deployed position 198, some embodiments of the frame-stabilizer segments 194 may have a range of motion that is about 90 degrees. This range of motion may extend slightly beyond 90 degrees or may be limited to a much smaller range.

The frame-stabilizer segments 194 may form respective frame stabilizer angles 200 that are greater than or equal to 25 degrees with the respective leg segments 46c when the frame-stabilizer segments 194 (and the leg segments 46c) are in the deployed position 198. The frame-stabilizer angles 200 may be greater than or equal to 30 degrees when the frame-stabilizer segments 194 are in the deployed position 198. The frame-stabilizer angles 200 may be greater than or equal to 35 degrees when the frame-stabilizer segments 194 are in the deployed position 198. The frame-stabilizer angles 200 may be greater than or equal to 40 degrees when the frame-stabilizer segments 194 are in the deployed position 198. The frame-stabilizer angles 200 may be greater than or equal to 45 degrees when the frame-stabilizer segments 194 are in the deployed position 198.

The frame-stabilizer segments 194 may form respective frame stabilizer angles 200 that are less than or equal to 20 degrees with the respective leg segments 46c when the frame-stabilizer segments 194 (and the leg segments 46c) are in the collapsed position 196. The frame-stabilizer angles 200 may be less than or equal to 15 degrees when the frame-stabilizer segments 194 are in the collapsed position 196. The frame-stabilizer angles 200 may be less than or equal to 10 degrees when the frame-stabilizer segments 194 are in the collapsed position 196. The frame-stabilizer angles 200 may be less than or equal to 5 degrees when the frame-stabilizer segments 194 are in the collapsed position 196. The frame-stabilizer angles 200 may be less than or equal to 3 degrees when the frame-stabilizer segments 194 are in the collapsed position 196.

Embodiments of the bike carrier 40 that include a bike-frame stabilizer 192 may employ a longer strap 172 for the quick-release mechanism 170. Rather than engaging the push bumper 20, the quick-release mechanism 170 may engage a different vehicle structure on the vehicle, such as a vehicle OEM part, such as a standard bumper 208. The strap 172 may be long enough to wrap around the standard OEM bumper 208 and attach to the post 174. Alternatively, the quick-release mechanism 170 may employ a hook 208, for example, having a curved portion 212 and a button portion 214. The button portion 214 may engage a strap hole 186 of the strap 172, and the curved portion may engage a lower edge of the standard OEM bumper 208, such as on the Dodge Charger.

The bike carrier 40 may be assembled from a bike carrier kit that may include: a carrier frame 42 including a pair of frame members 44 each having an upper segment (such as an arm segment 46a) and a lower segment (such as a central segment 46b or a leg segment 46c); a variable frame connection mechanism that is configured to directly or indirectly connect the frame members in a manner that permits a variable distance between the upper segments; and a quick-release mechanism configured for direct or indirect attachment to carrier frame 42, wherein the quick-release mechanism is configured for securing the carrier frame 42 directly or indirectly to a vehicle.

The bike carrier kit may also include the some or all of the various frame fasteners 108 (potentially including but not limited to the bolts 110, the nuts 112, the washers 114, and the caps 116), the limit fasteners 152 of the angle limit assemblies 150 (potentially including but not limited to the bolts 154, the nuts 156, the sleeves 158, and the caps 160, the strap 172 and the post 174 (potentially including but not limited to the bolt 176, the nut 178, the washers 180, the spacers 182, and the cap 184) of the quick-release mechanism 170, and the bike frame securement mechanism 80 (potentially including but not limited to the bike frame cradles 82, the quick-release connectors 84, and the attachment features 86).

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A bike carrier configured for placement about a vehicle, the bike carrier comprising:
a carrier frame including a first frame member and a second frame member, wherein the first frame member includes multiple first segments including a first arm segment directly or indirectly connected to a first leg segment, wherein the multiple first segments are directly or indirectly connected to each other at first nonzero angles, wherein the second frame member includes multiple second segments including a second arm segment directly or indirectly connected to a second leg segment, wherein the multiple second segments are directly or indirectly connected to each other at second nonzero angles;
a frame connector configured to connect directly or indirectly to the first frame member and the second frame member in a manner that permits relative movement between the first arm segment and the second arm segment; and
a quick-release mechanism configured for securing the bike carrier directly or indirectly to the vehicle,
wherein the bike carrier is configured to be coupled to a front of the vehicle by contact between multiple points on the bike carrier at different heights and the vehicle.

2. The bike carrier of claim 1, wherein the first frame member includes a first central segment connected directly or indirectly between the first arm segment and the first leg segment, wherein the first arm segment and the first central segment or the first leg segment are generally oriented at a first arm angle, wherein the second frame member includes a second central segment connected directly or indirectly between the second arm segment and the second leg segment, and wherein the second arm segment and the second central segment or the second leg segment are generally oriented at a second arm angle.

3. The bike carrier of claim 2, wherein at least two of the first central segment, the first arm segment, and the first leg segment are formed as a single integrated component.

4. The bike carrier of claim 2, wherein the first central segment, the first arm segment, and the first leg segment are formed as a single integrated component.

5. The bike carrier of claim 2, wherein the first arm angle and the second arm angle are fixed.

6. The bike carrier of claim 2, wherein at least one of the first arm angle and the second arm angle are adjustable.

7. The bike carrier of claim 2, wherein the first arm angle is smaller than or equal to 90 degrees.

8. The bike carrier of claim 2, wherein the first arm angle is greater than or equal to 25 degrees in a deployed state.

9. The bike carrier of claim 2, wherein the frame connector comprises a discrete bracket that is configured to connect the first leg segment to the second leg segment.

10. The bike carrier of claim 2, wherein the frame connector comprises a foot segment that is configured to connect the first leg segment to the second leg segment.

11. The bike carrier of claim 2, wherein the frame connector comprises one or more bumper spacers.

12. The bike carrier of claim 2, wherein the quick-release mechanism is connected to the frame connector.

13. The bike carrier of claim 2, wherein the front of the vehicle comprises first and second spaced-apart, generally horizontal structural members connected directly or indirectly to the vehicle, and wherein the quick-release mechanism is configured to engage the second horizontal structural member.

14. The bike carrier of claim 13, wherein the quick-release mechanism comprises a securement strap configured to couple to the second horizontal structural member.

15. The bike carrier of claim 2, wherein the carrier frame comprises first and second vertically-spaced coupling areas for coupling the carrier frame to first and second spaced-apart, generally horizontal structural members at or near the front of the vehicle.

16. The bike carrier of claim 15, wherein the first vertically-spaced coupling area of the carrier frame is positioned above the second vertically-spaced coupling area, and wherein the first frame member and the second frame member are configured to be coupled to the first vertically spaced coupling area.

17. The bike carrier of claim 16, wherein the first frame member is configured to couple to the first vertically spaced coupling area at the location of at least one of the first nonzero angles and wherein the second frame member is configured to couple to the first horizontal structural member at the location of at least one of the second nonzero angles.

18. The bike carrier of claim 2, wherein the bike carrier is configured to be coupled to a push bumper for a law enforcement vehicle.

19. The bike carrier of claim 2, wherein the bike carrier has a central axis positioned between the first leg segment and the second leg segment, wherein at least one of the first arm segment and the second arm segment is displaced at a variable angle from the central axis, wherein the variable angle has a range that spans from less than or equal to 1 degree to greater than or equal to 10 degrees.

20. The bike carrier of claim 2, wherein the first arm segment supports one or more cradles configured to support a bicycle frame.

21. The bike carrier of claim 2, further comprising a bike-frame stabilizer connected directly or indirectly to the first or second leg segments or the frame connector and configured to rest against vertical side frame pieces at or near the front of the vehicle.

22. The bike carrier of claim 21, wherein the bike-frame stabilizer comprises discrete first and second frame-stabilizer segments that are pivotally connected to the first or second leg segments or the frame connector.

23. The bike carrier of claim 1, wherein the carrier frame is bilaterally symmetrical.

\* \* \* \* \*